(12) United States Patent
Kawasaki

(10) Patent No.: US 11,809,763 B2
(45) Date of Patent: Nov. 7, 2023

(54) DISPLAY CONTROL METHOD, INFORMATION PROCESSING APPARATUS, AND STORAGE MEDIUM

(71) Applicant: CANON KABUSHIKI KAISHA, Tokyo (JP)

(72) Inventor: Nobuo Kawasaki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/751,853

(22) Filed: May 24, 2022

(65) Prior Publication Data
US 2022/0382493 A1 Dec. 1, 2022

(30) Foreign Application Priority Data
May 25, 2021 (JP) ................. 2021-087566

(51) Int. Cl.
*G06F 3/12* (2006.01)
*H04N 1/00* (2006.01)
*B41J 2/175* (2006.01)
*G03G 15/00* (2006.01)

(52) U.S. Cl.
CPC ............ *G06F 3/1229* (2013.01); *G06F 3/121* (2013.01); *H04N 1/00408* (2013.01); *B41J 2/17566* (2013.01); *B41J 2002/17573* (2013.01); *G03G 15/5016* (2013.01); *G03G 15/553* (2013.01)

(58) Field of Classification Search
CPC ... G06F 3/1229; G06F 3/121; H04N 1/00408; B41J 2/17566; B41J 2002/17573; G03G 15/5016; G03G 15/553
See application file for complete search history.

(56) References Cited

U.S. PATENT DOCUMENTS

| | | | |
|---|---|---|---|
| 9,645,773 B2 | 5/2017 | Honda et al. | |
| 2021/0303954 A1* | 9/2021 | Sato | ............ G06F 3/1285 |
| 2022/0009241 A1* | 1/2022 | Azechi | ............ G06F 3/121 |
| 2023/0171356 A1* | 6/2023 | Kodama | ............ H04N 1/00506 |
| | | | 715/744 |

FOREIGN PATENT DOCUMENTS

JP 2006-195953 A 7/2006

* cited by examiner

*Primary Examiner* — Iriana Cruz
(74) *Attorney, Agent, or Firm* — Venable LLP

(57) ABSTRACT

A method for display control is provided. The method includes obtaining information of a remaining amount display color displaying a remaining amount of a consumable supply, obtaining the information of a background color in a displaying area displaying the remaining amount of the consumable supply, and changing a display content in the displaying area on the basis of the remaining amount display color and the background color.

33 Claims, 20 Drawing Sheets

FIG.3

| | CATEGORIES OF CONSUMABLE SUPPLIES | REMAINING AMOUNTS OF CONSUMABLE SUPPLIES [%] | DISPLAY COLORS FOR CONSUMABLE SUPPLIES [RGB] | TITLES OF CONSUMABLE SUPPLIES |
|---|---|---|---|---|
| CONSUMABLE SUPPLY A | INK CARTRIDGE | 60 | 0xFF : 0xDA : 0x00 | INK Y |
| CONSUMABLE SUPPLY B | INK CARTRIDGE | 40 | 0x00 : 0x00 : 0x00 | INK BK |
| CONSUMABLE SUPPLY C | INK CARTRIDGE | 45 | 0x00 : 0xCF : 0xFF | INK C |
| CONSUMABLE SUPPLY D | INK CARTRIDGE | 90 | 0xF2 : 0x00 : 0xFF | INK M |

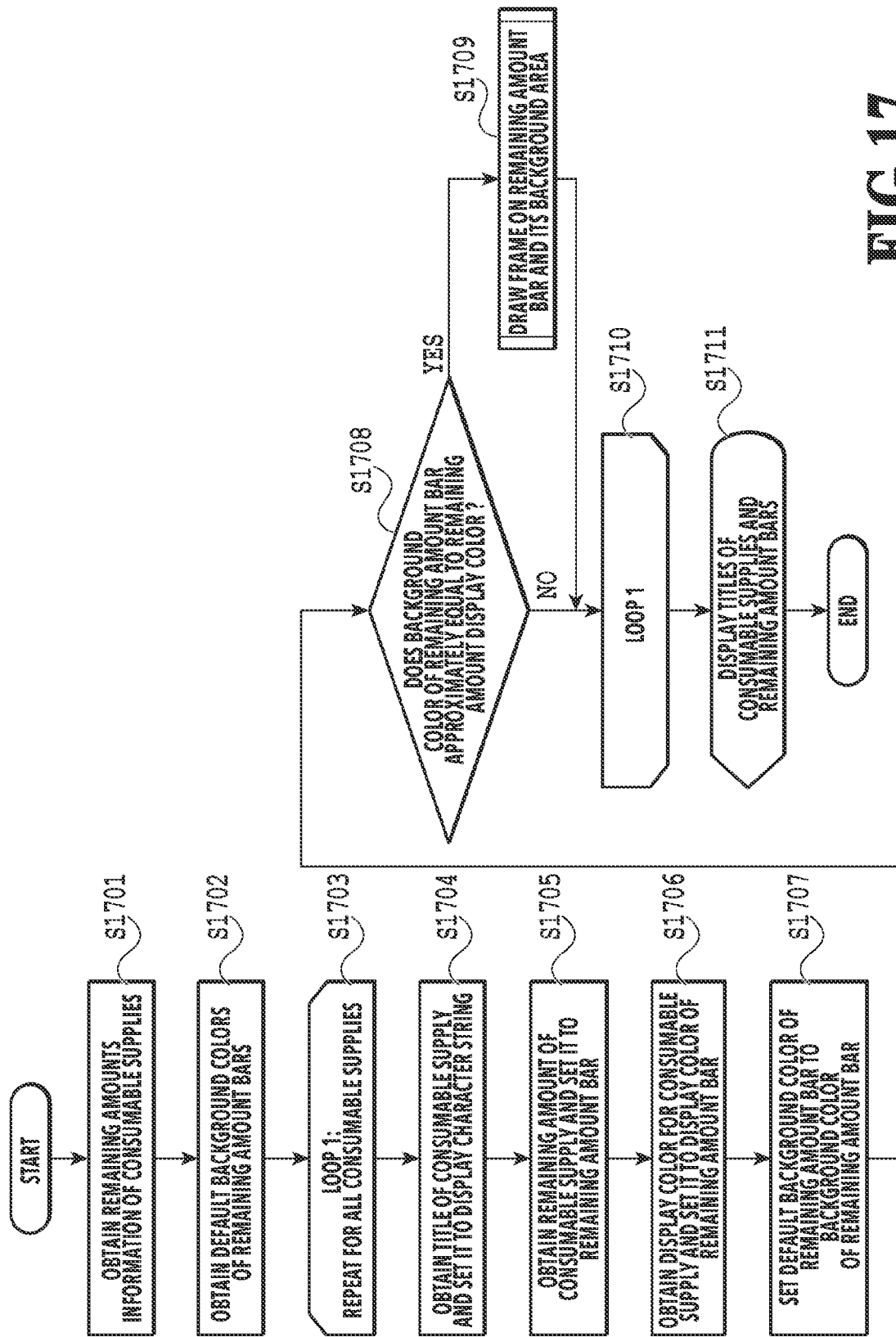

DISPLAY CONTROL METHOD, INFORMATION PROCESSING APPARATUS, AND STORAGE MEDIUM

BACKGROUND

Field

The present disclosure relates to a display control technology for remaining amounts of consumable supplies.

Description of the Related Art

Technologies for displaying remaining amounts of consumable supplies have been provided. For example, Japanese Patent Laid-Open No. 2006-195953 discloses a technology in which an application software receives information such as the remaining amounts and color information of the consumable supplies used in a peripheral device from the peripheral device, and displays the remaining amounts of the consumable supplies using the received information.

Background colors of areas displaying the remaining amounts of the consumable supplies are set independently from the information received from the peripheral device. Therefore, there is a possibility that users may not recognize the remaining amount of the consumable supply in a case that a remaining amount display color displaying the remaining amount of the consumable supply approximately equals to the background color.

SUMMARY

A method for display control according to an aspect of the present disclosure includes obtaining information of a remaining amount display color displaying a remaining amount of a consumable supply, obtaining the information of a background color in a displaying area displaying the remaining amount of the consumable supply, and changing a display content in the displaying area on the basis of the remaining amount display color and the background color.

Further features of the present disclosure will become apparent from the following description of exemplary embodiments with reference to the attached drawings.

BRIEF DESCRIPTION OF THE DRAWINGS

FIG. 3 shows an example of a remaining amount information list of consumable supplies;

FIG. 17 is a flowchart illustrating an example of the display control processing;

FIG. 18 is a diagram showing the relationship of FIGS. 18A and 18B

DESCRIPTION OF THE EMBODIMENTS

Figure 1:
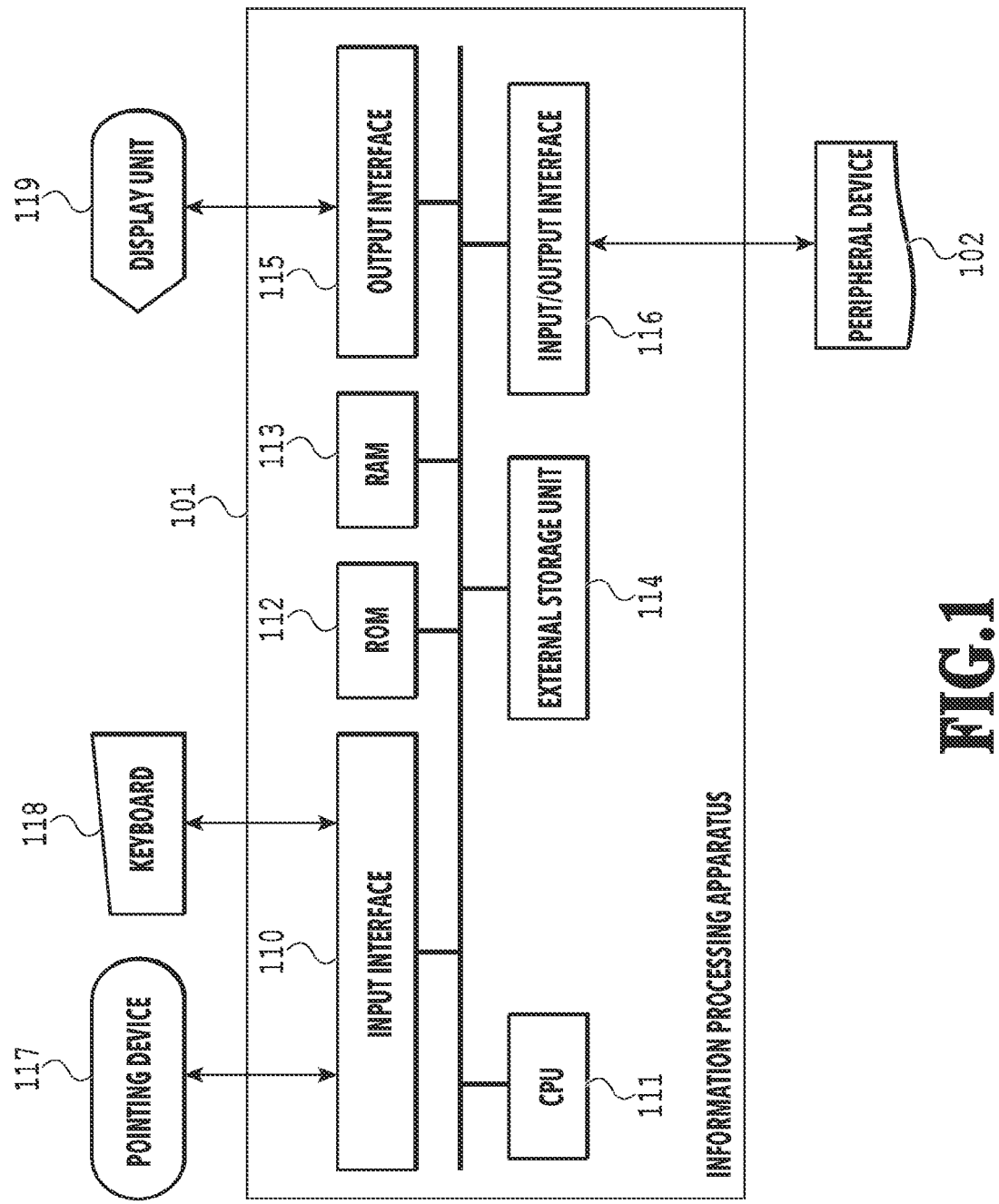
FIG. 1 is a diagram showing an example of a hardware configuration of a system.

Preferred embodiments of the present disclosure will be described below by referring to the accompanying drawings. It should be noted that the following embodiments do not limit the present disclosure, and all combinations of the features described in the embodiments are not necessary to solve problems of the present disclosure.

Embodiment 1

An example of a system in the present embodiment in which an information processing apparatus and a peripheral device are connected each other via a network will be described below. Various apparatuses such as personal computers, smart phones, and tablet terminals may be exemplified as the information processing apparatus. Network correspondence printers, copy machines, facsimile machines, scanners, digital cameras, or multi-function device combining these functions may be exemplified as the peripheral device. An application software for controlling the peripheral device and monitoring operation conditions are installed in the information processing apparatus. The application software may be provided by a manufacturer of the peripheral device or a supplier other than the manufacturer of the peripheral device, i.e. a third party.

The application software displays remaining amounts of consumable supplies on the basis of information obtained from the peripheral device. The application software determines remaining amounts colors of the consumable supplies displaying the remaining amounts of the consumable supplies on the basis of the information obtained from the peripheral device. On the other hand, background colors on display areas displaying the remaining amounts of the consumable supplies are determined independently from the information obtained from the peripheral device. For example, the background colors are set depending on a display mode of an operating system (hereinafter referred to as OS), such as a light mode and a dark mode, in a case of the application software executed on OS. Alternately, unique colors may be set as the background colors by the application software.

Therefore, for example, in a case that both the background color of a remaining amount bar displaying the remaining amount of an ink of the printer and an ink color are white, a display color of a remaining amount bar is also set to be white. As a result, users may not recognize the remaining amount of the white ink. Same problem may occur not only in the information processing apparatus but also in the peripheral device. That is, the same problem may occur in a case that the remaining amount information is displayed on a display panel installed on the peripheral device and the remaining amounts colors of the consumable supplies are dynamically set according to attached ink cartridges, etc.

The present embodiment provides a processing that can improve a visibility of the users in a case that the background color approximately equals to the remaining amounts colors of the consumable supplies (e.g. a color difference between them is within a predetermined threshold value) on the display area displaying the remaining amount of the consumable supplies. Specific configurations will be described below.

Hardware Configuration

FIG. 1 is a diagram showing an example of the hardware configuration of a system in the present embodiment. FIG. 1 mainly shows the hardware configuration of the information processing apparatus 101 that is a host computer.

The information processing apparatus 101 includes an input interface 110, CPU 111, ROM 112, RAM 113, an external storage unit 114, an output interface 115, and an input/output interface 116. Input devices, such as a keyboard 118 and a pointing devise 117, are connected to the input interface 110. Display devices, such as a display unit 119, are connected to the output interface 115. The display unit 119 may be a touch panel display, and the display unit 119 may also function as an input/output device.

ROM 112 stores an initializing program. The external storage unit 114 stores various programs, such as application programs. OS, and printer drivers, and various data. RAM 113 functions as a work memory, etc. in a case the various programs stored in the external storage unit 114 are executed.

CPU 111 executes processings according to the programs stored in ROM 112 or the external storage unit 114 in the present embodiment, and provides functions and the processings in flowcharts described later. Moreover, in a case that CPU 111 executes the processings according to the programs stored in ROM 112 or the external storage unit 114, the processings by CPU 111 function as a remaining amount display software for the consumable supplies 201 (FIG. 2) described later. As a result, the remaining amounts of consumable supplies are displayed on the display unit 119.

The peripheral device 102 is connected to the information processing apparatus 101 via the input/output interface 116. Although the information processing apparatus 101, the peripheral device 102, and the display unit 119 are shown as independent components in FIG. 1, they may be integrated as the single information processing apparatus. In this case, the information processing apparatus 101 can be assumed as the peripheral device 102, which means that the remaining amount information is displayed on the display unit 119 installed on the peripheral device.

Software Configuration Diagram

Figure 2:
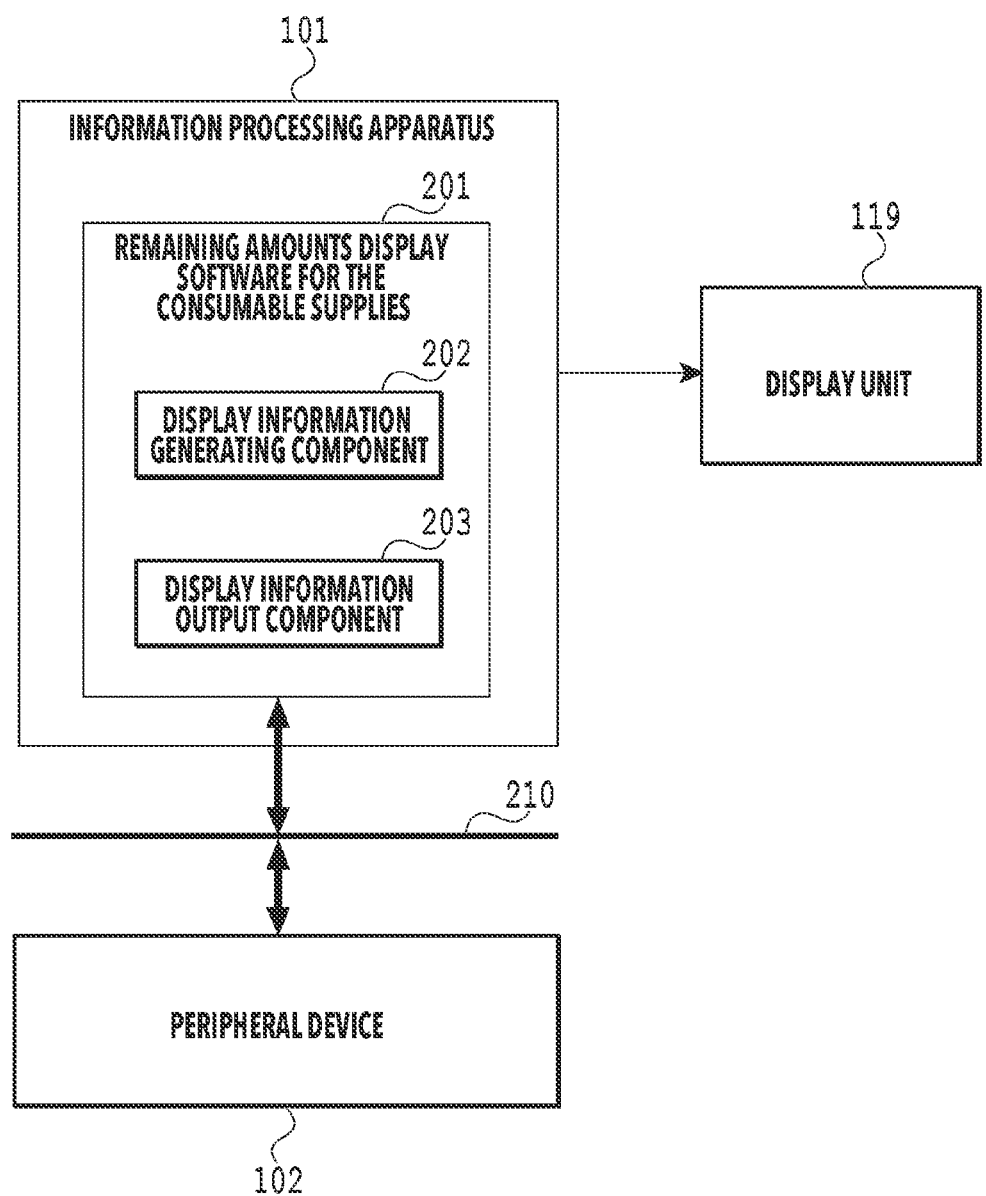
FIG. 2 is a diagram showing a block configuration of a software displaying remaining amounts.

FIG. 2 is a diagram showing a block configuration of a software displaying the remaining amounts of consumable supplies in the present embodiment. The information processing apparatus 101 and the peripheral device 102 are communicably connected each other via the network 210. Although a local area network (LAN) is used as the network 210 in the present embodiment, a wide area network (WAN) may be used. Wired, wireless, and their combination are available as a network connection type. The information processing apparatus 101 controls the peripheral device 102 via the network 210. The connection between the information processing apparatus 101 and the peripheral device 102 may be provided by a cable connection, such as a USB connection, instead of the network.

The information processing apparatus 101 includes the remaining amounts display software for the consumable supplies 201. The remaining amounts display software for the consumable supplies 201 includes a display information generating component 202 and a display information output component 203. The display information generating component 202 receives information from the peripheral device 102 and generates the display information to display the remaining amount on the display unit 119. The display information may be the information used for a screen of displaying the remaining amount information of the consumable supplies shown in FIG. 4 described later. The display information output component 203 outputs a predetermined screen on the display unit 119 using the display information generated by the display information generating component 202. Thus, the remaining amounts display software for the consumable supplies 201 generates the display information and performs the display control such as displaying the predetermined screen on the display unit 119 using the generated display information.

Remaining Amount List of Consumable Supplies

FIG. 3 shows an example of a remaining amount information list of consumable supplies. The remaining amount information list of the consumable supplies is an example of the remaining amount information of the consumable supplies that is received by the remaining amounts display software for the consumable supplies 201 from the peripheral device 102. In an example of the remaining amount information list of the consumable supplies 301 shown in FIG. 3, information of ink cartridges is described as the information of the consumable supplies assuming the printer as the peripheral device 102. The remaining amount information of the consumable supplies includes consumable supply categories 306, the remaining amounts of the consumable supplies 307, display colors for the consumable supplies 308 and titles of the consumable supplies 309. In the example of FIG. 3, the information with respect to the four consumable supplies A302 to D305 is obtained from the peripheral device 102.

Display Screen

Figure 4:
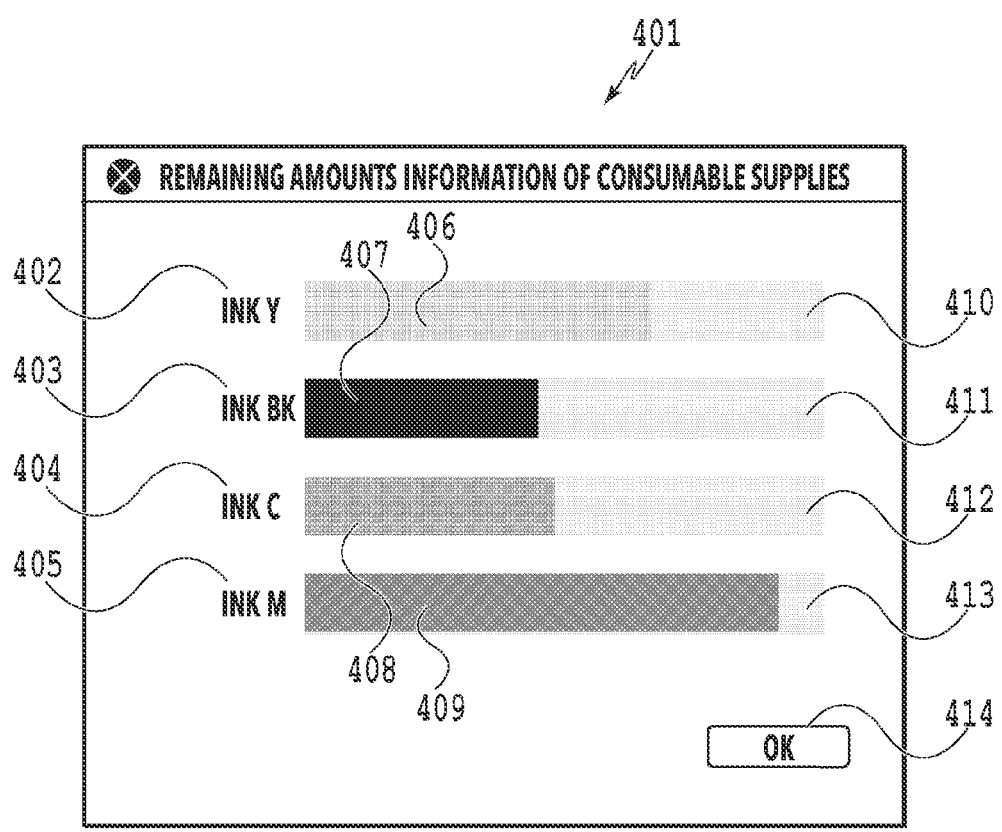
FIG. 4 shows an example of a screen displayed in a display unit.

FIG. 4 shows an example of the screen displayed in a display unit 119. The display information generating component 202 of the remaining amounts display software for the consumable supplies 201 generates the display information. The display information output component 203 displays the display screen 401 displaying the remaining amount information of the consumable supplies shown in FIG. 4 using the generated information.

The display screen 401 in FIG. 4 is generated and displayed on the basis of the remaining amount information list of consumable supplies 301 in FIG. 3. For example, character strings included in the titles of the consumable supplies 309 in FIG. 3 are displayed in display character strings 402 to 405 in the display screen 401 in FIG. 4, That is, each of the display character string 402, 403, 404, and 405 displays the consumable supply A302, B303, C304, and D305, respectively.

The display information generating component 202 selects and sets the display color used for each of the remaining amount bars 406 to 409 (referred to as a remaining amount display color) from the display colors for the consumable supplies 308 in the remaining amount information list of consumable supplies 301, respectively. The display information generating component 202 sets a length of each of the remaining amount bars 406 to 409 from the remaining amount of the consumable supplies 307 in the remaining amount information list of consumable supplies 301, respectively. The display information output component 203 displays the remaining amount bars 406 to 409 using set lengths and display colors on the display screen 401.

In a case that the remaining amounts display software for the consumable supplies 201 is not used, colors of the backgrounds 410 to 413 of the remaining amount bars 406 to 409 (referred to as background colors) are set independently from the display colors for the consumable supplies. Therefore, the remaining amount display colors of the remaining amount bars 406 to 409 may approximately equal to the background colors of the backgrounds 410 to 413 depending on the values of the display colors for the consumable supplies 308 included in the remaining amount information list of consumable supplies 301. In this case, for example, the user may hardly distinguish the remaining amount bar 406 from the background 410. Similarly, the user may hardly distinguish each of the remaining amount bars 407, 408, and 409 from the backgrounds 411, 412, and 413, respectively.

In the present embodiment, an example in which the display information generating component 202 sets the remaining amount display colors that enables the users to distinguish the remaining amount bars appropriately from the backgrounds on the basis of the information of the display colors for the consumable supplies 308 will be described. The display screen 401 is closed in a case of pressing an OK button 414.

Flowchart

Figure 5:
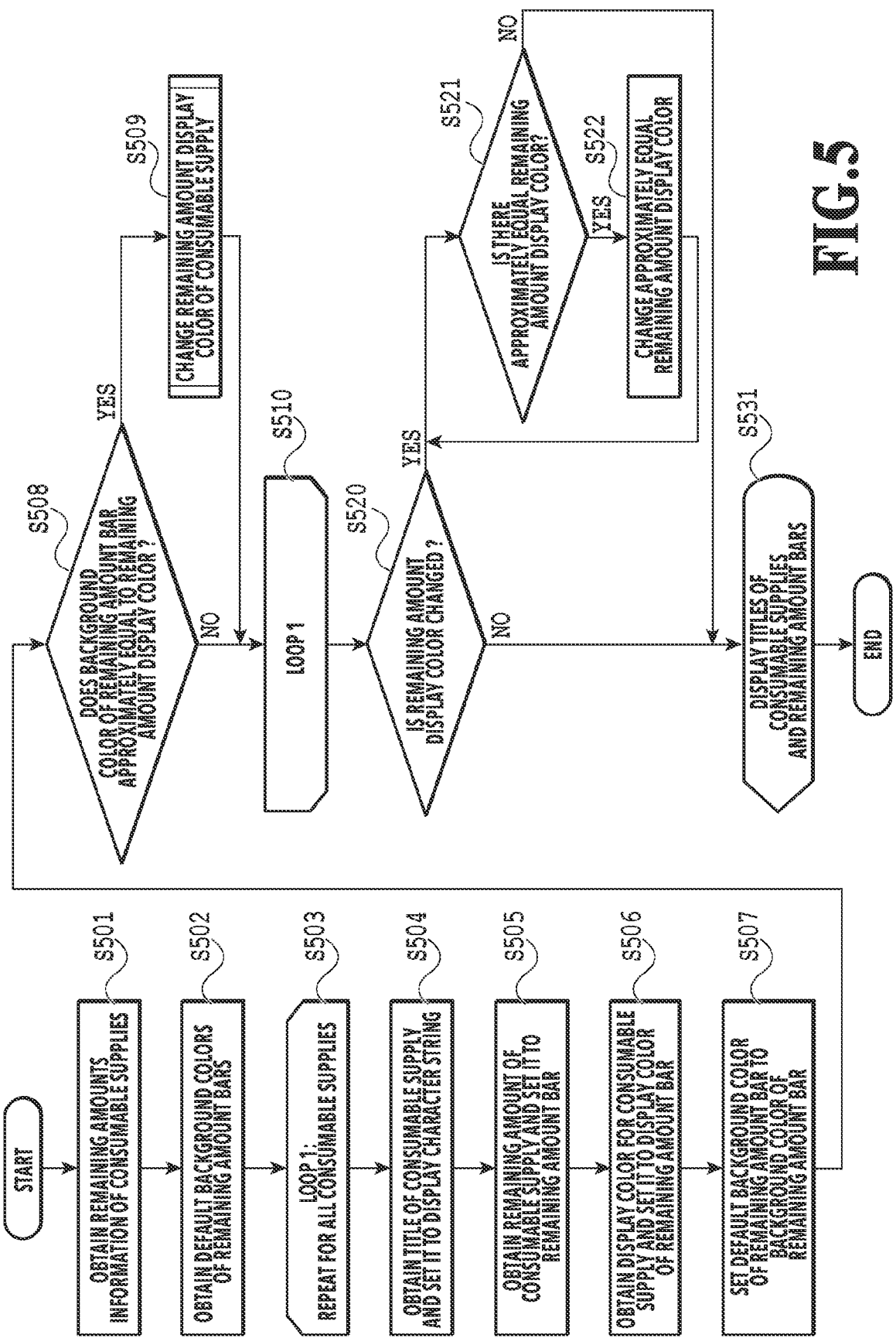
FIG. 5 is a flowchart illustrating an example of a display control processing.

FIG. 5 is a flowchart illustrating an example of a display control processing in the present embodiment in which the remaining amounts display software for the consumable supplies 201 displays the display screen of consumable supplies 401 in FIG. 4. CPU 111 deploys program codes stored in the external storage unit 114 on the RAM 113 and executes the program codes in a series of processings described in the flowchart in FIG. 5. Alternatively, all or a part of functions in steps in FIG. 5 may be performed by a hardware, such as ASIC, FPGA, and an electronic circuit. Note that a symbol 'S' in the description of each processing represents the step in the flowchart. The above description is same as in the flowcharts other than FIG. 5. The remaining amounts display software for the consumable supplies 201 directs the display information generating component 202 to execute the processing in FIG. 5 in a case that the user requests to display the display screen of the remaining amount information of the consumable supplies.

At S501, the display information generating component 202 obtains the remaining amount information of consumable supplies from the peripheral device 102. More specifically, the display information generating unit 202 obtains the remaining amount information list of consumable supplies 301 in FIG. 3. Then, at S502, the display information generating component 202 obtains default background colors of the remaining amount bars. The background colors may be set depending on a display mode of OS (light mode, dark mode, etc.). Alternately, unique colors may be set by the application software (the remaining amounts display software for the consumable supplies).

Then, a loop processing for a number of consumable supplies is executed from S503 to S510. That is, the processing from S503 to S510 is executed for each of the consumable supplies, respectively in sequence. The display information generating component 202 obtains the titles of the consumable supplies 309 from the remaining amount information of the consumable supplies obtained in S501, and sets the character strings included in the titles of the consumable supplies 309 to the display character strings at S504. For example, the display information generating component 202 sets the character strings of the consumable supply A302 included in the titles of the consumable supplies 309 to the display character string 402. An example for the flowchart in which the consumable supply to be processed is the consumable supply A302 will be described below.

Then, at S505, the display information generating component 202 obtains the remaining amounts of the consumable supplies 307 from the remaining amount information of the consumable supplies obtained in S501, and set the remaining amounts of the consumable supplies 307 to the length of the remaining amount bar of the consumable supplies 406. Then, at S506, the display information generating component 202 obtains the display colors for the consumable supplies 308 from the remaining amount information of the consumable supplies obtained in S501, and set a color value to the display color of the remaining amount bar of the consumable supplies 406. Then, at S507, the display information generating component 202 sets the default background color to the background color of the background in the display area displaying the remaining amount of the consumable supplies 410 (i.e. the background of the remaining amount bar). As described above, the default background color may be set depending on the display mode, or the unique color may be set by the application software.

Next, at S508, the display information generating component 202 determines if the background color of the background of the remaining amount bar of the consumable supplies 410 approximately equals to the remaining amount display color of the remaining amount bar 406.

Figure 6:
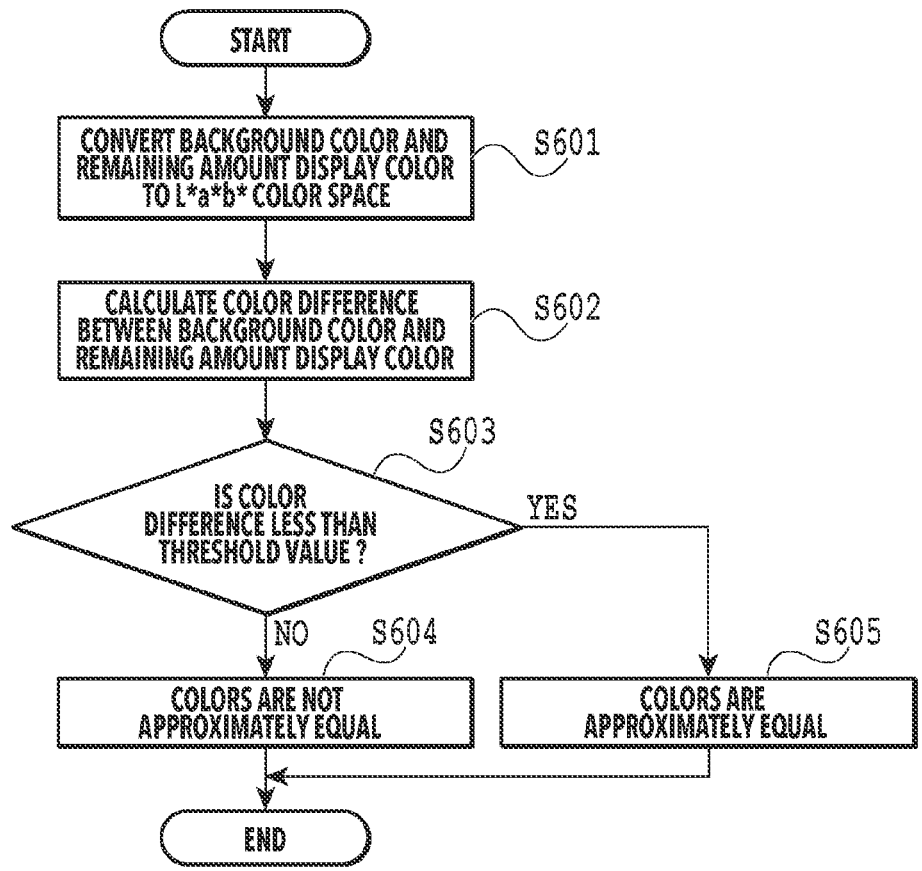
FIG. 6 is a flowchart illustrating an example of a determination processing.

FIG. 6 is a flowchart illustrating an example of a determination processing at S508. An approximation determination processing is performed in a L*a*b* color space in the determination processing in FIG. 6. The display information generating component 202 executes from S601 in a case of the determination processing at S508.

At S601, the display information generating component 202 converts the background color of the background of the remaining amount bar of the consumable supply 410 and the remaining amount display color of the remaining amount bar 406 to the L*a*b* color space, respectively. Note that, in a case that a color conversion processing of the default background color of the remaining amount bar is completed, only the remaining amount display color of the remaining amount bar of the consumable supply 406 is converted. Here, L1, a1, and b1 represent L, a, b values of the converted background color of the background of the remaining amount bar of the consumable supply 410, respectively, and L2, a2, and b2 represent the L, a, b values of the converted remaining amount display color of the remaining amount bar 406, respectively.

Next, at S602, the display information generating component 202 calculates a color difference ΔEab between the background color of the background of the remaining amount bar of the consumable supply 410 and the remaining amount display color of the remaining amount bar 406. The color difference ΔEab may be calculated according to Formula (1). Note that the above values are represented in a subscript format in Formula (1).

$$\Delta E_{ab} = \sqrt{(L_2-L_1)^2 + (a_2-a_1)^2 + (b_2-b_1)^2} \quad (1)$$

At S603, the display information generating component 202 determines if the color difference ΔEab calculated at S602 is less than a threshold value. The threshold value is an arbitrary constant held by the remaining amounts display software for the consumable supplies 201. The threshold value may be referred to as a first threshold value. The first threshold value may be a common threshold value for all consumable supplies, or a specific threshold value being different for each consumable supply. In the case that the color difference ΔEab is less than the threshold value, the display information generating component 202 proceeds to S605 and determines that the background color of the background of the remaining amount bar of the consumable supply 410 approximately equals to the remaining amount display color of the remaining amount bar 406. On the other hand, in a case that the color difference ΔEab is greater than or equals to the threshold value, the display information generating component 202 proceeds to S604 and determines that the background color of the background of the remaining amount bar of the consumable supply 410 does not approximately equal to the remaining amount display color of the remaining amount bar 406.

Description is continued with reference to FIG. 5. At S508, the display information generating component 202 proceeds to S509 in a case of determining that the background color of the background 410 approximately equals to the display color of the remaining amount bar 406, otherwise proceeds to S510. At S510, the processing proceeds to S520 in a case that the processing for all consumable supplies is completed, and returns to S503 for repeating the processing in a case that the processings for some consumable supplies are not completed.

At S509, the display information generating component 202 changes the remaining amount display color of the remaining amount bar 406. Then, the processing proceeds to S510.

Figure 7:
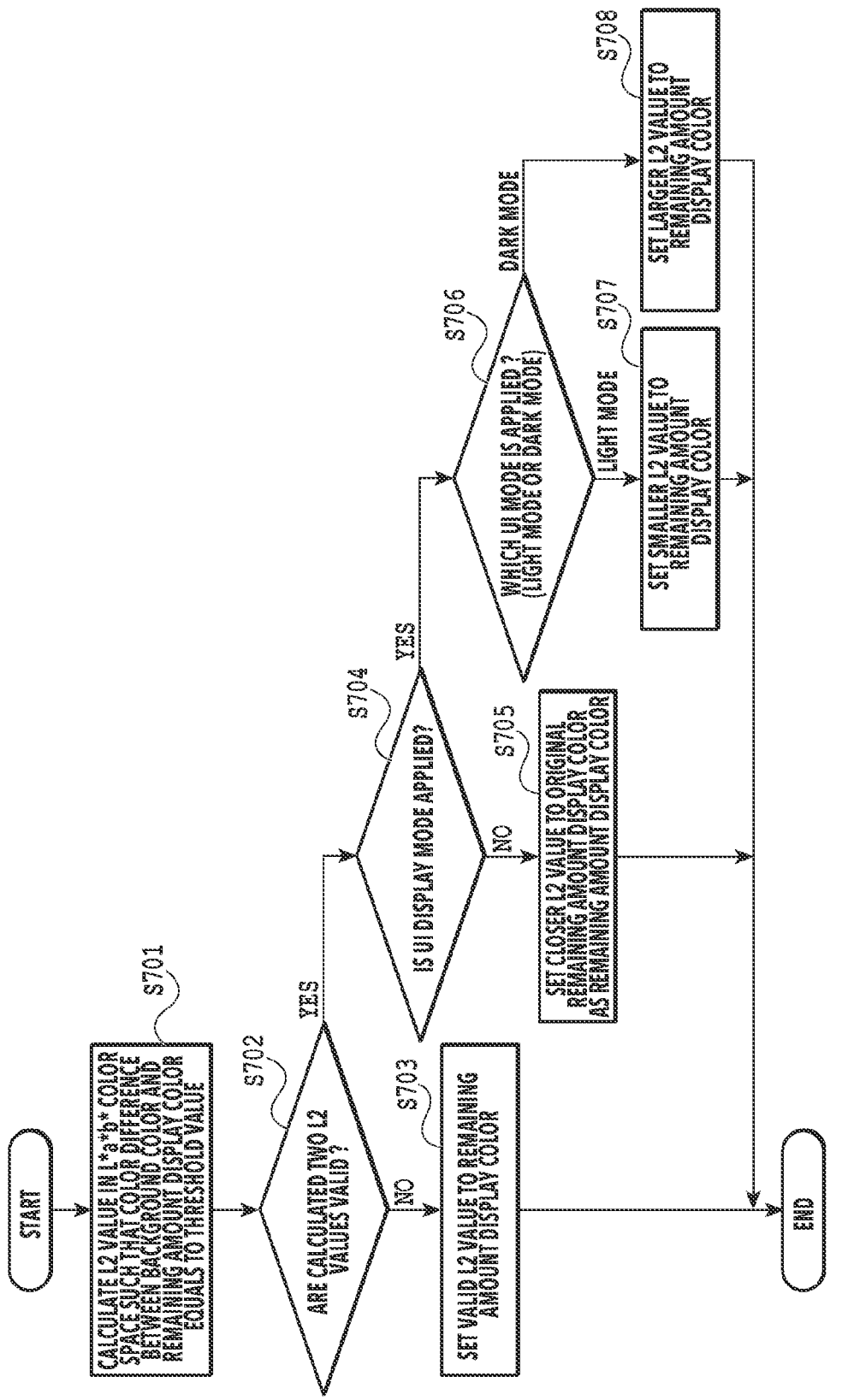
FIG. 7 is a flowchart illustrating an example of a change processing of remaining amount display colors.

FIG. 7 is a flowchart illustrating an example of a change processing of remaining amount display colors of the remaining amount bar of the consumable supply 406 at S509. FIG. 7 shows an example that improves a discriminating ability between the remaining amount display color and the background color by changing a L value representing a brightness in the L*a*b* color space. In a case of execution S509, the display information generating component 202 starts the processing from S701.

At S701, the display information generating component 202 calculates L2 value of the remaining amount display color of the remaining amount bar of the consumable supply 406 such that the color difference between the background color of the background 410 and the display color of the remaining amount bar 406 equals to a predetermined threshold value. In this example, the predetermined threshold value in S701 is assumed to be the first threshold value described in S603 in FIG. 6. L2 value can be calculated by assuming that L1, a1, a2, b1 and b2 are known numbers and only L2 is an unknown number in the Formula (1). As apparent from Formula (1), two L2 values are calculated.

Next, at S702, the display information generating component 202 determines if both of the two L2 values calculated in S701 are in a valid range. The processing proceeds to S704 in a case that both of the two values are determined to be within the valid range, and proceeds to S703 in a case that an either value is determined to be invalid. The determination of validness at S702 is performed if the values to be determined are within a values range in an applied color space.

The display information generating component 202 sets the valid L2 value calculated in S701 to the L value of the remaining amount display color of the remaining amount bar of the consumable supply 406 at S703 in the case that the either value is determined to be invalid. Then, the processing in FIG. 7 is completed and returns to S509.

On the other hand, at S704, the display information generating component 202 checks a display mode of a user interface (hereinafter referred to as UI) in the OS of the information processing apparatus 101 in the case that both of the two values are determined to be within the valid range. Then, the component 202 determines if the display mode of UI is applied to the remaining amounts display software for the consumable supplies 201. The processing proceeds to S706 in a case that the display mode of UI is determined to be applied, and proceeds to S705 in a case that the display mode of UI is determined to be not applied.

In the case that the display mode of UI is not applied, the display information generating component 202 selects a closer L2 value to the remaining amount display color of the consumable supplies 308 among the two L2 values calculated in S701, and sets the selected L2 value to the L value of the remaining amount display color of the remaining amount bar 406 at S705. Then, the processing in FIG. 7 is completed.

On the other hand, in the case that the display mode of UI is applied, the display information generating component 202 determines the display mode of UI at S706. Here, it is assumed that the display mode of UI includes a light mode and a dark mode. The processing proceeds to S707 in a case that the display mode of UI is determined to be the light mode, and proceeds to S708 in a case that the display mode of UI is determined to be the dark mode.

The display information generating component 202 selects a smaller L2 value among the two L2 values calculated in S702, and sets the selected L2 value to the L value of the remaining amount display color of the remaining amount bar 406 at S707. Then, the processing in FIG. 7 is completed and returns to S509. Since the brightness of the background color is high in the light mode, the smaller L2 value is applied to decrease the brightness of the remaining amount display color, which improves a discriminating ability between the remaining amount display color and the background color.

On the other hand, at S708, the display information generating component 202 selects a larger L2 value among the two L2 values calculated in S702, and sets the selected L2 value to the L value of the remaining amount display color of the remaining amount bar 406. Then, the processing in FIG. 7 is completed and returns to S509. Since the brightness of the background color is low in the dark mode, the larger L2 value is applied to increase the brightness of the remaining amount display color, which improves a discriminating ability between the remaining amount display color and the background color.

The above processing is executed for all consumable supplies to be processed. That is, although an example of the consumable supply A302 is described above, same processing is executed for the consumable supplies B303, C304, and D305. The above processing changes an approximately equal remaining amount display color in the case that the background color of the remaining amount bar approximately equals to the remaining amount display color of the remaining amount bar. Thus, a situation that the background color of the remaining amount bar approximately equals to the remaining amount display color of the remaining amount bar is solved by the above processing, which enables the users to distinguish the remaining amount display color easily from the background color of the remaining amount bar.

Description is continued with reference to FIG. 5. After executing the loop processing from S503 to S510, the processing proceeds to S520. The display information generating component 202 determines if the remaining amount display color is changed at S520. That is, the component determines if the processing in S509 is completed. The processing proceeds to S531 in a case that the remaining amount display color is not changed, and proceeds to S521 in a case that the remaining amount display color is changed.

At S521, the display information generating component 202 determines if there are the remaining amount display colors being approximately equal to each other. For example, the change processing of the remaining amount display color in S509 may cause the remaining amount display color to close to other remaining amount display colors. The remaining amount display color of the consumable supply being approximately equal to other remaining amount display color prevents the user to distinguish the remaining amount display color from the other remaining amount display color. Therefore, the determination of an approximation between the remaining amount display colors are performed at S521. Note that the determination in S521 can be performed same as the determination in S508. In this case, the threshold value used (a second threshold value) may be the first threshold value described above, or may be other threshold values being different from the first threshold value. The process proceeds to S522 in a case that there are the remaining amount display colors being appropriately equal to each other, otherwise proceeds to S531.

At S522, the display information generating component 202 changes the remaining amount display colors being appropriately equal to each other. Here, the remaining amount display colors being appropriately equal to each other will be referred to as a first remaining amount display color and a second remaining amount display color. For example, in a case that the first remaining amount display color is changed in S509 or in S522 for the second and later time and the second remaining amount display color is not changed in S509 or in S522 for the second and later time, the first remaining amount display color is changed. On the other hand, in a case that the both remaining amount display colors are changed in S509 or in S522 for the second and later time, an either remaining amount display color may be changed. The remaining amount display color may be changed such that the color difference matches the second threshold value. Then, the processing returns to S521 for repeating the processing.

At S531, the display information output component 203 outputs and displays the remaining amounts information of the consumable supplies to the display unit 119 on the basis of the information set in the above processing (display information), and complete the processing.

As described above, in the present embodiment, the color difference between the remaining amount display color of the consumable supply obtained from the peripheral device and the background color in the remaining amount display area is calculated. Then, the remaining amount display color of the consumable supply is changed in a case that the color difference is within the predetermined threshold value. This enables the user to recognize the remaining amount of the consumable supply easily. Note that, in the example described in the present embodiment, since only the brightness of the display colors are changed, the users can easily distinguish the remaining amount display color from the background color of the remaining amount bar while a displayed color impression of the consumable supplies obtained from the peripheral device is kept.

Embodiment 2

The processing of changing the remaining amount display color in the case that the background color approximately equals to the remaining amount display color in the display area displaying the remaining amounts of the consumable supplies is described in Embodiment 1. There is a case that the remaining amount display color may be changed to a color having a different impression from an actual color of the consumable supply. More specifically, it may occur in a case that the color information in the display colors for the consumable supplies 308 is a white color (RGB value is close to 0xFF:0xFF:0xFF), or a black color (RGB value is close to 0x00:0x00:0x00) and S703 in FIG. 7 is executed. In this case, there is a possibility that the remaining amount display color is changed to a color close to a gray color that has different impression from the actual color of the ink. Therefore, an alternate change processing will be described in the present embodiment. The processing basically changes the remaining amount display color, but it may change the background color considering the color difference between the background color and the remaining amount display color. Note that since a basic configuration is same as in Embodiment 1, a description will be given of main different points from the Embodiment 1.

Figure 8:
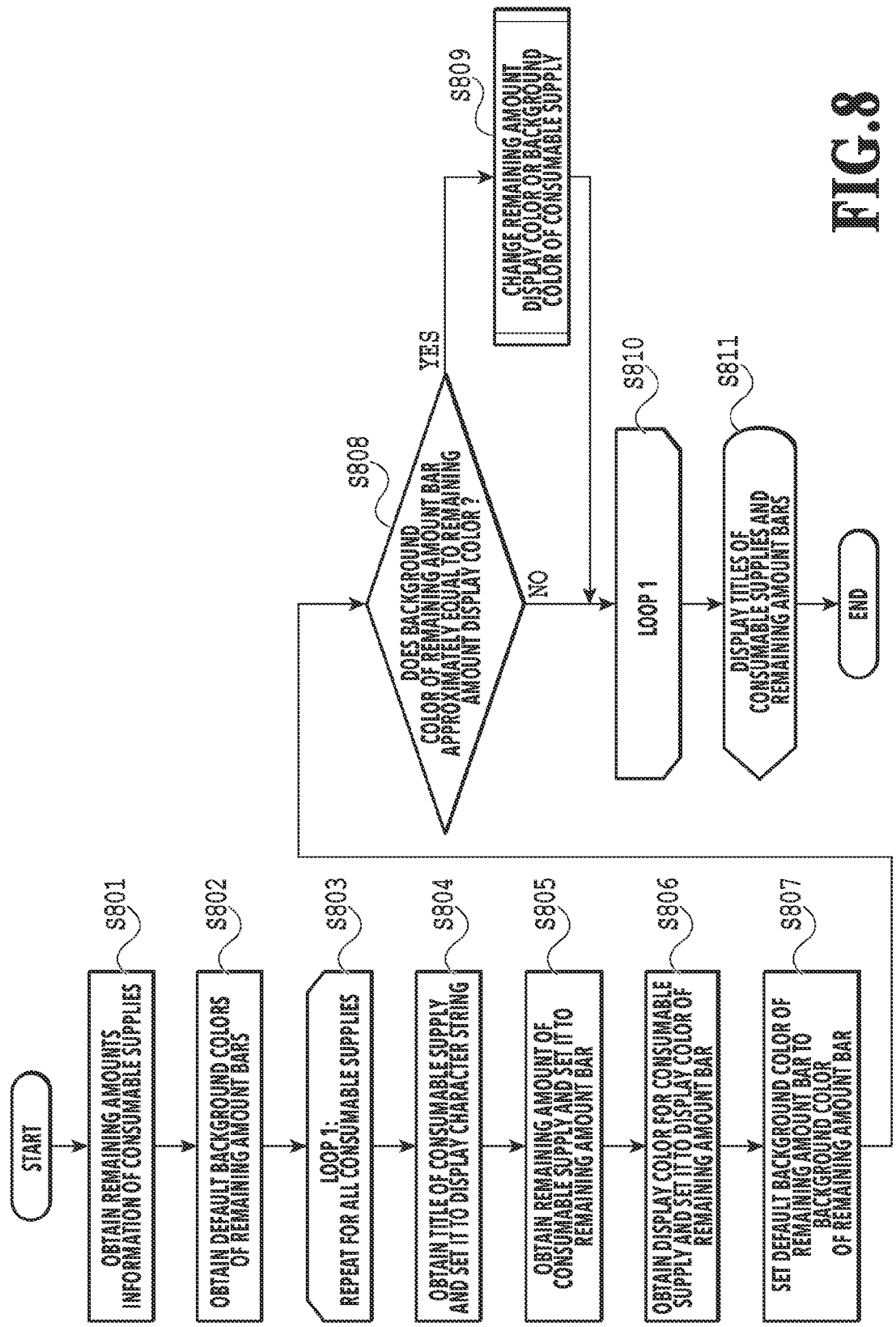
FIG. 8 is a flowchart illustrating an example of the display control processing.

FIG. 8 is a flowchart illustrating an example of a display control processing by the remaining amounts display software for the consumable supplies 201 in the present embodiment. Since processings S801 to S811 excluding S809 in FIG. 8 are same as the example of the processings S501 to S510 and S531 described in Embodiment 1, a description of the processings other than S809 will be skipped. Note that although it is not shown in FIG. 8, the processings S520 to S522 described in Embodiment 1 may be executed after exiting a loop processing at S810 same as in Embodiment 1.

At S809, the display information generating component 202 changes the remaining amount display color of the consumable supply or the background color in the present embodiment. That is, the present embodiment differs from Embodiment 1 in that the display information generating component 202 may change not only the remaining amount display color of the consumable supply but also the background color in the present embodiment.

Figure 9:
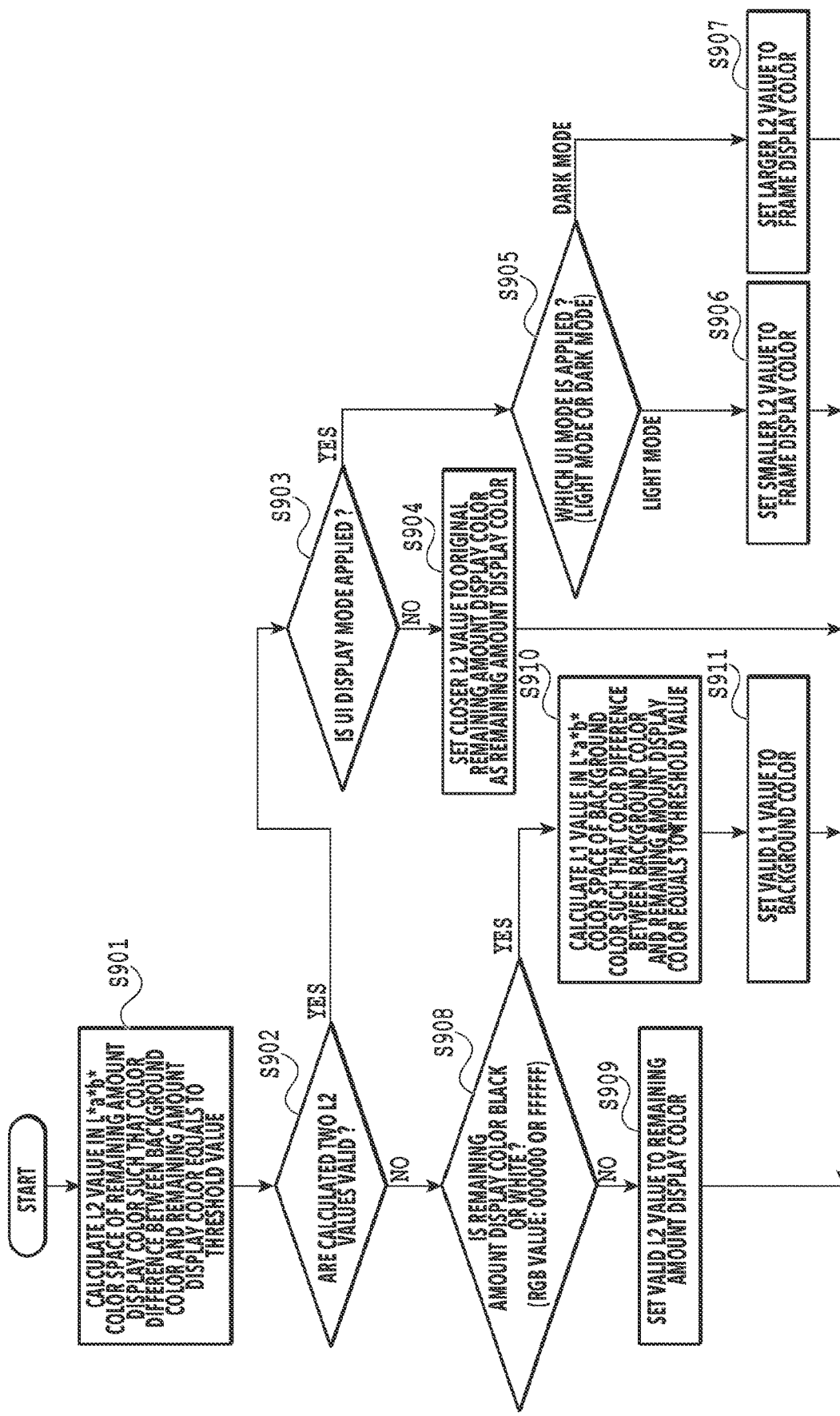
FIG. 9 is a flowchart illustrating a detail of a change processing of display colors.

FIG. 9 is a flowchart illustrating a detail of the change processing of the remaining amount display color of the consumable supply or the background color in S809. In the flowchart in FIG. 9, the processings S901 to S902 are same as the processings S701 to S702. In addition, the processings S903 to S907 are same as the processings S704 to S708. That is, the processings of the flowchart in FIG. 9 differ from the processings in FIG. 7 in a processing performed after determining that the either value is invalid at S902. In this case, the processing proceeds to S908.

At S908, the display information generating component 202 determines if the remaining amount display color of the remaining amount bar of consumable supply 406 is an either of the black color or the white color. The RGB value of the black color is 0x00:0x00:0x00 and the RGB value of the white color is 0xFF:0xFF:0xFF. The display information generating component 202 may determine the remaining amount display color to be the white color or the black color in a case that the RGB value of the remaining amount display color matches the above RGB values, or in a case that the RGB value of the remaining amount display color is in a fixed range from the above RGB values. In a case that the display information generating component 202 determines the remaining amount display color of the remaining amount bar of the consumable supply 406 to be the white color or the black color at S908, the processing proceeds to S910, otherwise proceeds to S909.

The processing in S909 is same as the processing in S703 in FIG. 7. That is, at S909, the display information generating component 202 sets the valid L2 value calculated in S901 to the L value of the remaining amount display color of the remaining amount bar of the consumable supply 406. Then, the processing in FIG. 9 is completed and returns to S809. On the other hand, at S910, the display information generating component 202 calculates L1 value of the background color of the background 410 such that the color difference between the background color of the background 410 and the display color of the remaining amount bar of the consumable supply 406 equals to the threshold value. The threshold value in this example is same as the first threshold value described in Embodiment 1. Then, the processing proceeds to S911. L1 value can be calculated by assuming that L2, a1, a2, b1 and b2 are known numbers and only L1 is an unknown number in the Formula (1).

At S911, the display information generating component 202 sets the valid L1 value calculated in S910 to the L value of the background color of the background of the remaining amount bar of the consumable supply 410, completes the processing in FIG. 9, and returns to S809. Note that the validness may be determined at S911 if the values are within the range of the applied color space.

As described above, the change processing of the background color is performed in the case that the remaining amount display color of the consumable supply is the white color or the black color in the present embodiment in addition to the processing in Embodiment 1. The processing in the present embodiment enables the user to distinguish the remaining amount display colors of the consumable supplies easily from the background colors, and can display the remaining amount display colors close to the actual colors of the consumable supplies. This helps the user to image the actual consumable supplies.

Embodiment 3

The processing of changing the remaining amount display color in the case that the background color approximately equals to the remaining amount display color in the display area displaying the remaining amounts of the consumable supplies is described in Embodiment 1. The processing of changing the background color in the case that the background color approximately equals to the remaining amount display color in the display area displaying the remaining amounts of the consumable supplies will be described in the present embodiment. Note that since a basic configuration is same as in Embodiment 1, a description will be given of main different points from the Embodiment 1.

Figure 10:
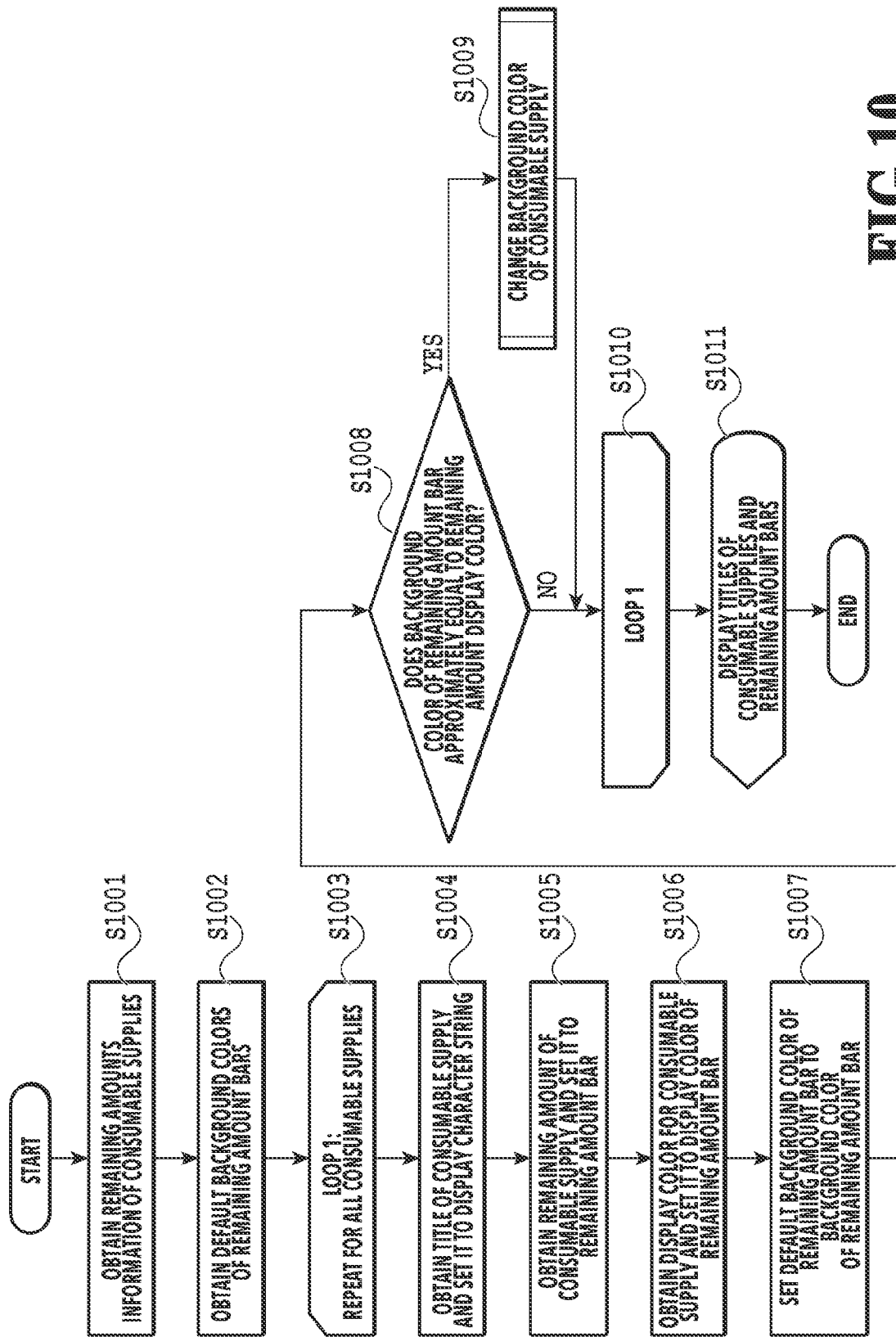
FIG. 10 is a flowchart illustrating an example of the display control processing.

FIG. 10 is a flowchart illustrating an example of a display control processing by the remaining amounts display software for the consumable supplies 201 in the present embodiment. Since processings S1001 to S1011 excluding S1009 in FIG. 10 are same as the example of the processings S501 to S510 and S531 described in Embodiment 1, a description of the processings other than S1009 will be skipped. Note that the processings S520 to S522 described in Embodiment 1 is not executed in the present embodiment. At S1009, the display information generating component 202 changes the background color of the background of the remaining amount bar of the consumable supply 410.

Figure 11:
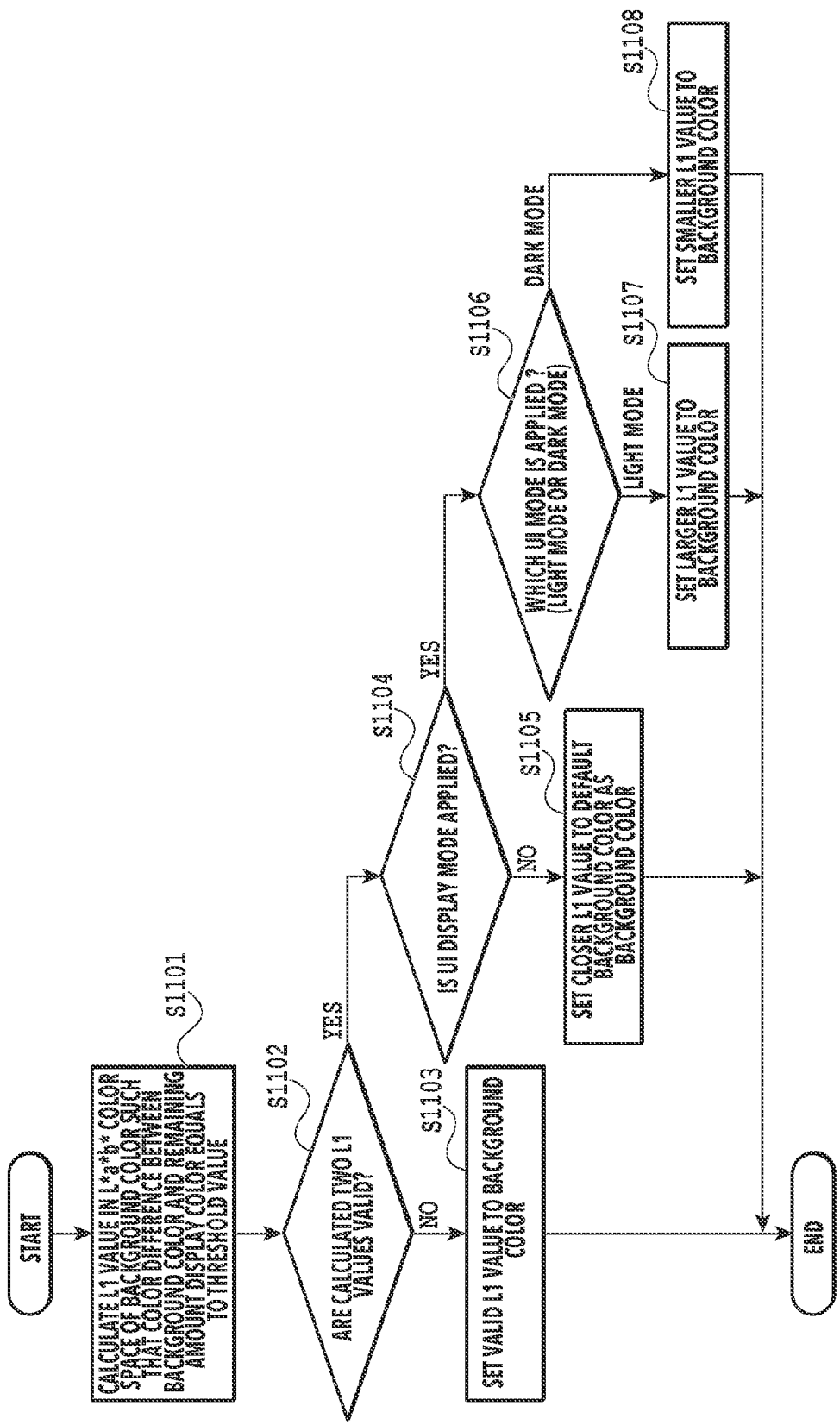
FIG. 11 is a flowchart illustrating a detail of a change processing of background colors.

FIG. 11 is a flowchart illustrating a detail of a change processing of background color of the consumable supply at S1009.

At S1101, the display information generating component 202 calculates L1 value of the background color of the background 410 such that the color difference between the background color of the background 410 and the display color of the remaining amount bar of the consumable supply 406 equals to the threshold value. The threshold value in this example is same as the first threshold value described in Embodiment 1. Then, the processing proceeds to S1102. L1 value can be calculated by assuming that L2, a1, a2, b1 and b2 are known numbers and only L1 is an unknown number in the Formula (1).

At S1102, the display information generating component 202 determines if the both of two L1 values calculated in S1101 are within the valid range. The processing proceeds to S1104 in a case that both of the two values are determined to be within the valid range, and proceeds to S1103 in a case that an either value is determined to be invalid. The validness is determined at S1102 if the values are within the range of the applied color space.

At S1103, the display information generating component 202 sets the valid L1 value calculated in S1101 to the L value of the background color of the background of the remaining amount bar of the consumable supply 410. Then, the processing in FIG. 11 is completed and returns to S1009.

On the other hand, at S1104, the display information generating component 202 checks a display mode of UI in the OS of the information processing apparatus 101. Then, the component 202 determines if the display mode of UI is applied to the remaining amounts display software for the consumable supplies 201. The processing proceeds to S1106 in a case that the display mode of UI is determined to be applied, and proceeds to S1105 in a case that the display mode of UI is determined to be not applied.

In the case that the display mode of UI is not applied, the display information generating component 202 selects a closer L1 value to the default background color of the remaining amount bar among the two L1 values calculated in S1101, and sets the selected L1 value to the L value of the background color of the remaining amount bar 410 at S1105. Then, the processing in FIG. 11 is completed.

At S1106, the display information generating component 202 determines the display mode of UI. Here, it is assumed that the display mode of UI includes a light mode and a dark mode same as in Embodiment 1. The processing proceeds to S1107 in a case that the display mode of UI is determined to be the light mode, and proceeds to S1108 in a case that the display mode of UI is determined to be the dark mode.

At S1107, the display information generating component 202 selects a larger L1 value among the two L1 values calculated in S1102, and sets the selected L1 value to the L value of the background color of the remaining amount bar of the consumable supply 410. Then, the processing in FIG. 11 is completed and returns to S1009. Since the brightness of the background color is high in the light mode, the larger L1 value is applied to further increase the brightness of the background color, which improves a discriminating ability between the remaining amount display color and the background color.

On the other hand, at S1108, the display information generating component 202 selects a smaller L1 value among the two L1 values calculated in S1102, and sets the selected L1 value to the L value of the background color of the remaining amount bar of the consumable supply 410. Then, the processing in FIG. 11 is completed and returns to S1009. Since the brightness of the background color is low in the dark mode, the smaller L1 value is applied to further decrease the brightness of the background color, which improves a discriminating ability between the remaining amount display color and the background color.

As described above, in the present embodiment, the color difference between the remaining amount display color of the consumable supply obtained from the peripheral device and the background color in the remaining amount display area is determined. Then, the background color is changed in a case that the color difference is within the predetermined threshold value. Since only the background colors are changed in the present embodiment, the display colors for the consumable supplies obtained from the peripheral device are not changed. This enables the user to recognize the actual colors of the consumable supplies and the remaining amounts of the consumable supplies easily.

In the processing described above, only the background color is changed in the case of the consumable supply in which the background color of the remaining amount bar approximately equals the remaining amount display color. That is, only the background color of the consumable supply being approximately equal to the remaining amount display color is changed. In a modified example, in a case that a background color of a consumable supply is changed, background colors of other consumable supplies may be also changed. This provides a consistent display pattern, which improves the visibility of the users. Then, for example, in a case the background color of a second consumable supply is changed according to a background color change of a first consumable supply, it is checked if the background color of the second consumable supply approximately equals to the remaining amount display color of the second consumable supply. In a case that the changed background color of the second consumable supply approximately equals to the remaining amount display color of the second consumable supply, the background colors may be changed again such that a background color being not approximately equal to the background colors of all consumable supplies is applied to the all consumable supplies.

Embodiment 4

The processing of changing the background color in the case that the background color approximately equals to the remaining amount display color in the display area displaying the remaining amounts of the consumable supplies is described in Embodiment 3. The processing in which a pattern, such as shading, is drawn in the backgrounds instead of changing the background colors will be described in the present embodiment. Note that since a basic configuration is same as in Embodiment 1, a description will be given of only different points from the Embodiment 1.

Figure 12:
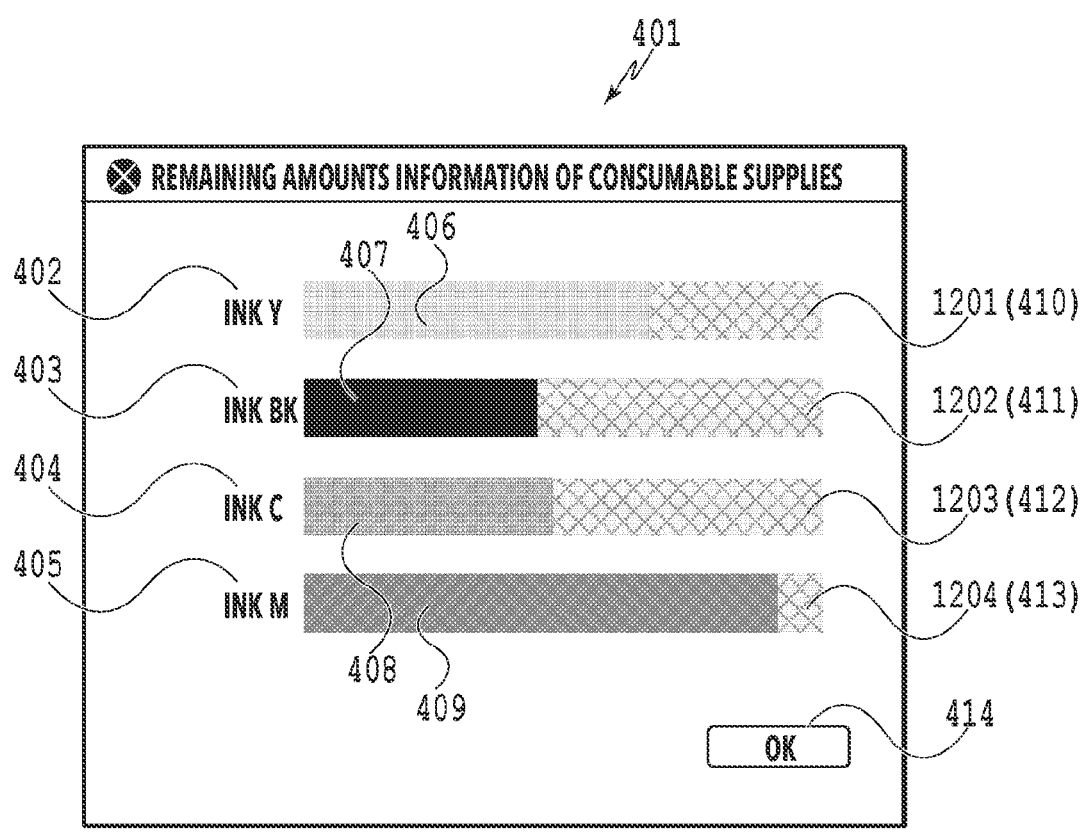
FIG. 12 is a drawing of a shading pattern.

FIG. 12 is a drawing of shading patterns 1201 to 1204 in the backgrounds of the remaining amount bars of the consumable supplies 410 to 413.

Figure 13:
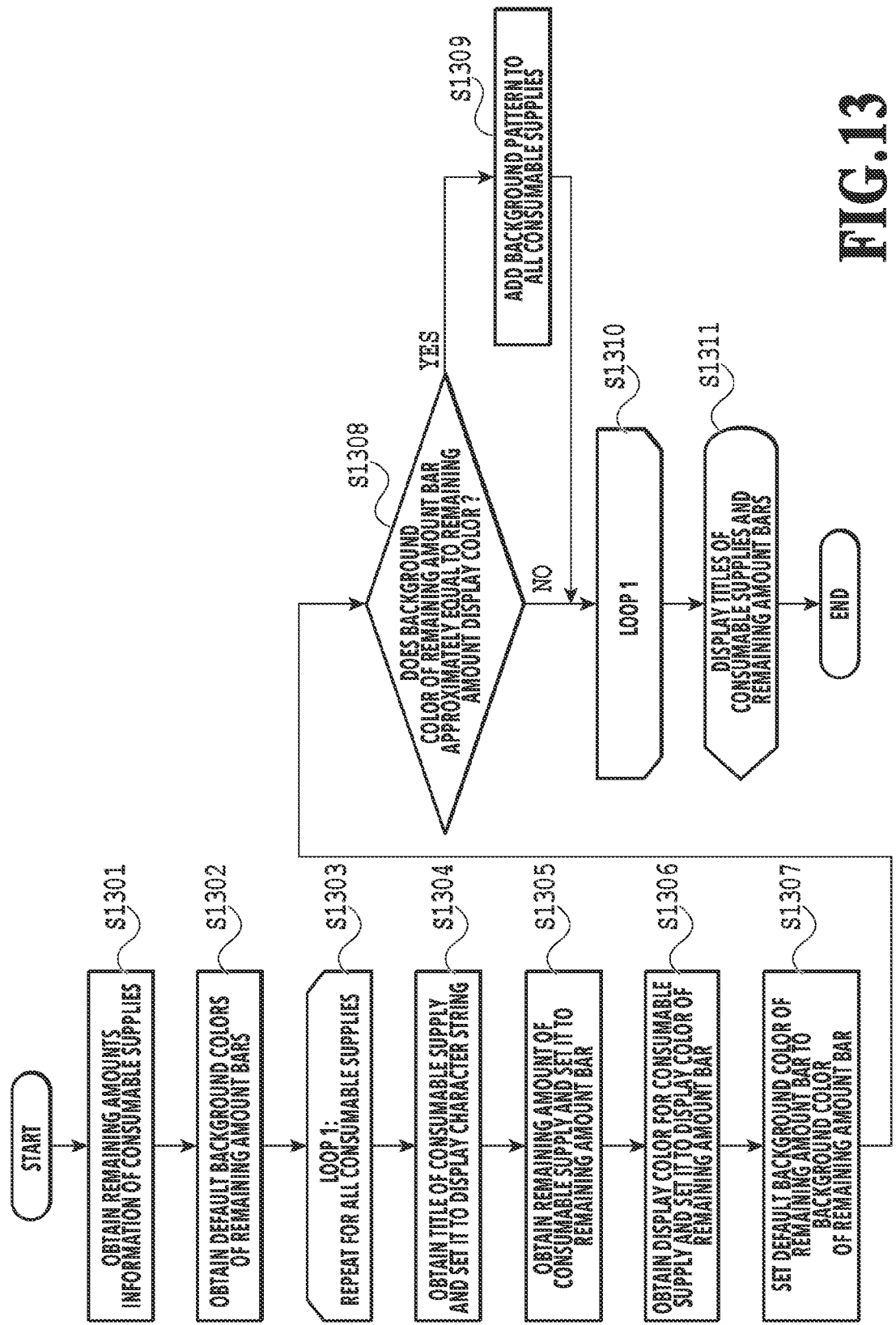
FIG. 13 is a flowchart illustrating an example of the display control processing.

FIG. 13 is a flowchart illustrating an example of a display control processing by the remaining amounts display software for the consumable supplies 201 in the present embodiment. Since processings S1301 to S1311 excluding S1309 in FIG. 13 are same as the example of the processings S501 to S510 and S531 described in Embodiment 1, a description of the processings other than S1309 will be skipped. Note that the processings S520 to S522 described in Embodiment 1 is not executed in the present embodiment.

At S1309, the display information generating component 202 adds background patterns for all consumable supplies. That is, the present embodiment differs from Embodiment 1 in that the pattern 1201, such as the shading, is drawn in the background in the present embodiment while the remaining amount display color of the consumable supply to be processed is changed in Embodiment 1. In addition, the patterns 1201 to 1204, such as shading, are drawn in the backgrounds of the remaining amount bars of the all consumable supplies 410 to 413 in a case that the background color of at least one consumable supply approximately equals to the remaining amount display color. An arbitrary pattern may be drawn instead of the shading. A fixed pattern provided by the remaining amounts display software for the consumable supplies 201 may be applied, or patterns selected by the user may be applied. The same pattern is preferably applied to the all consumable supplies 410 to 413 in order to provide the consistent visibility, but a different pattern may be applied to some consumable supplies. Alternately, the patterns different from each other are applied to the backgrounds of the consumable supplies, respectively.

As described above, in the present embodiment, the color difference between the remaining amount display color of the consumable supply obtained from the peripheral device and the background color in the remaining amount display area is calculated. Then, the pattern, such as the shading, is drawn in the background in a case that the color difference is within the predetermined threshold value. The display colors for the consumable supplies obtained from the peripheral device are not changed in the present embodiment. This enables the user to recognize the actual colors of the consumable supplies and the remaining amounts of the consumable supplies easily.

Embodiment 5

Although the examples in which the remaining amounts of the consumable supplies are displayed using the remaining amount bars are described in Embodiment 1 to Embodiment 4, an example in which the remaining amounts of the consumable supplies are displayed using the character strings will be described in the present embodiment.

Figure 14:
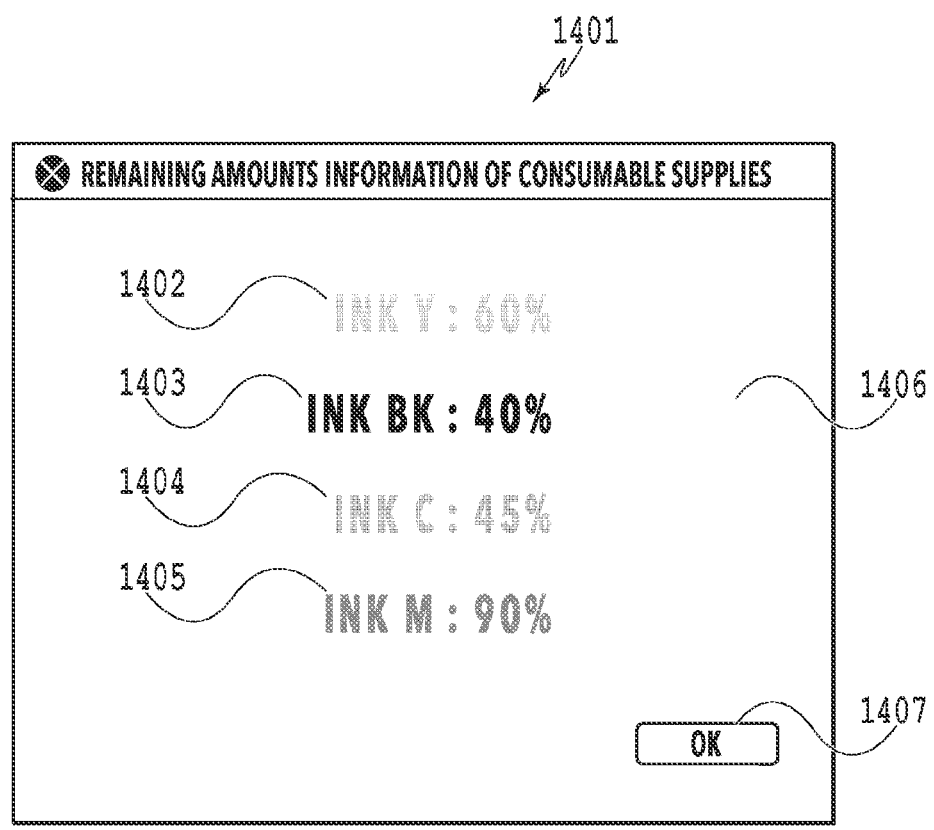
FIG. 14 shows a screen displaying the remaining amount information of consumable supplies.

FIG. 14 shows a display screen 1401 displaying the remaining amount information of consumable supplies in the present embodiment. The display information output component 203 displays the display screen 1401 on the display unit 119 on the basis of the display information generated by the display information generating component 202. The consumable supplies A302, B303, C304, and D305 in the remaining amount information list of consumable supplies 301 are represented by character strings 1402, 1403, 1404, and 1405, respectively. The display information generating component 202 determines a text color of each of the character strings 1402 to 1405 from the display colors for the consumable supplies 308 in the remaining amount information list of consumable supplies 301, respectively. In addition, the display information generating component 202 determines the remaining amounts in percent from the remaining amount of the consumable supplies 307 in the remaining amount information list of consumable supplies 301, respectively. Then, the display information output component 203 displays the display screen 1401 on the display unit 119 on the basis of the determined information.

In a case that the remaining amounts display software for the consumable supplies 201 is not used, a color of the background 1406 on the display screen 1401 for the remaining amounts information of the consumable supplies is set independently from the text colors for the consumable supplies. For example, a unique color is set depending on a display mode of OS, such as the light mode and the dark mode, in the case of the application software executed on OS. Alternately, the unique color may be set by the application software. Therefore, the background color of the background 1406 may approximately equal to the text color depending on the value of the display colors for the consumable supplies 308 in the remaining amount information list of consumable supplies 301, which prevent the user from recognizing the text easily.

In the present embodiment, a processing in which the display information generating component 202 sets the text colors of character strings 1402 to 1405 that enables the users to distinguish the character strings 1402 to 1405 for displaying the remaining amount appropriately from the background 1406 on the basis of the information of the display colors for the consumable supplies 305 will be described.

Figure 15:
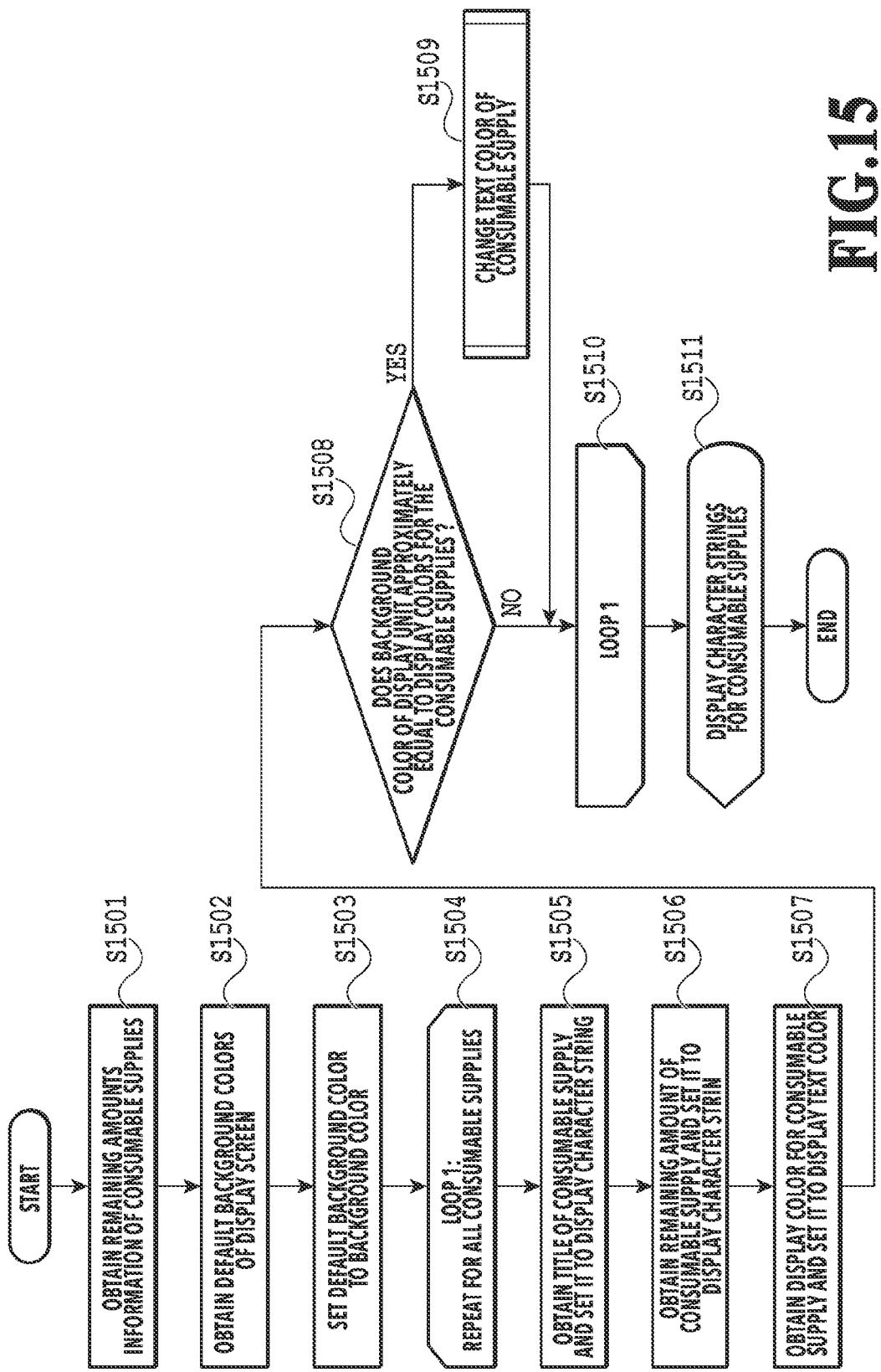
FIG. 15 is a flowchart illustrating an example of the display control processing.

FIG. 15 is a flowchart illustrating an example of a display control processing by the remaining amounts display software for the consumable supplies 201 in the present embodiment.

At S1501, the display information generating component 202 obtains the remaining amount information list of consumable supplies 301 from the peripheral device 102 as the remaining amount information of consumable supplies. Then, at S1502, the display information generating component 202 obtains a default background color of the display screen. The background color is set depending on a display mode of OS, such as the light mode and the dark mode. Alternately, unique color may be set by the application software. Next, at S1503, the display information generating component 202 sets the default background color obtained in S1502 to the background color of the background 1406 on the display screen 1401.

Then, a loop processing for a number of consumable supplies is executed from S1504 to S1510. That is, the processing from S1504 to S1510 is executed for each of the consumable supplies, respectively in sequence.

At S1505, the display information generating component 202 obtains the title of consumable supply 309, and set the value to the character string 1402 on the display screen 1401. An example for the flowchart in which the consumable supply to be processed is the consumable supply A302 will be described below. Next, at S1506, the display information generating component 202 obtains the remaining amount of the consumable supply 307, and set the value to the character string 1402. Then, at S1507, the display information generating component 202 obtains the display color for the consumable supply 308, and set the value to the character string 1402 on the display screen 1401.

Next, at S1508, the display information generating component 202 determines if the background color of the background 1406 approximately equals to the text color of the character string 1402. Since the same processing as described in FIG. 6 can be applied for the determination in S1508, the detailed description will be skipped. In the present embodiment, L1, a1, and b1 represent L, a, b values of the background color of the background 1406, respectively, and L2, a2, and b2 represent the L, a, b values of the text color of the text string 1402 in the remaining amounts information of the consumable supplies, respectively. At S1508, the display information generating component 202 proceeds to S1509 in a case of determining that the background color of the background 1406 approximately equals to the text color of the text string 1402, otherwise proceeds to S1510.

At S1509, the display information generating component 202 changes the text color of the text string 1402 in the remaining amounts information of the consumable supplies, and proceeds to S1510. The same processing as described in the processing flow in FIG. 7 can be applied for changing the text color of the text string 1402 in the remaining amounts information of the consumable supplies. In this case, as described above, L1, a1, and b1 represent L, a, b values of the background color of the background 1406, respectively, and L2, a2, and b2 represent the L, a, b values of the text color of the text string 1402 in the remaining amounts information of the consumable supplies, respectively.

Note that although it is not shown in FIG. 15, the processings S520 to S522 described in Embodiment 1 may be executed after exiting a loop processing at S1510 same as in Embodiment 1. That is, the text color may be changed again in a case that the text color approximately equals text colors of other consumable supplies due to changing the text color.

As described above, in the present embodiment, the color difference between the remaining amount display color of the consumable supply obtained from the peripheral device and the background color in the remaining amount display area is calculated. Then, the text color of the consumable supply is changed in a case that the color difference is within the predetermined threshold value. This enables the user to recognize the remaining amount of the consumable supply easily. Note that, in the present embodiment, since only the brightness of the display colors are changed, the users can easily distinguish the text colors of the consumable supplies from the background color while a displayed color impression of the consumable supplies obtained from the peripheral device is kept.

Embodiment 6

The processing of drawing the pattern, such as the shading, in the backgrounds in the case that the background color approximately equals to the remaining amount display color in the display area displaying the remaining amounts of the consumable supplies is described in Embodiment 4. The processing in which frames are drawn in the remaining amount bars displaying the remaining amounts of the consumable supplies and in their backgrounds will be described in the present embodiment.

Figure 16:
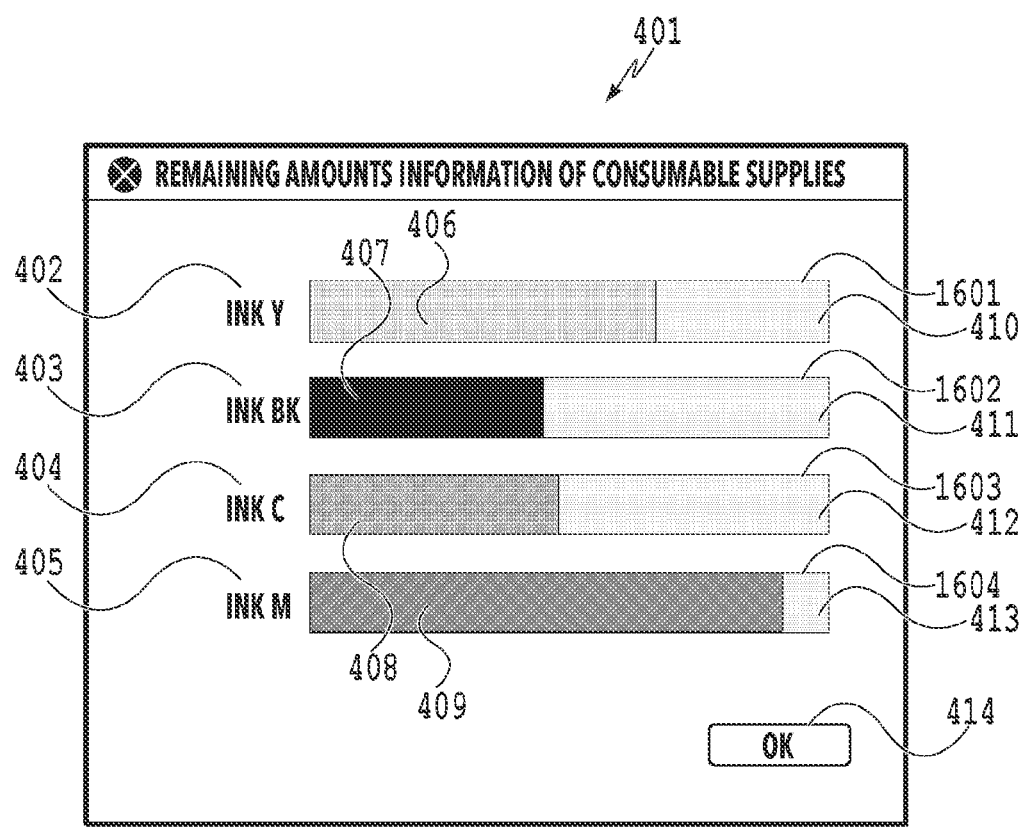
FIG. 16 shows a screen in which frames are drawn.

FIG. 16 is a drawing of frames 1601 to 1604 drawn in the remaining amount bars of the consumable supplies 406 to 409 and the backgrounds 410 to 413 of the remaining amount bars, respectively.

FIG. 17 is a flowchart illustrating an example of a display control processing by the remaining amounts display software for the consumable supplies 201 in the present embodiment. Since processings S1701 to S1711 excluding S1709 in FIG. 17 are same as the example of the processings S501 to S510, and S531 described in Embodiment 1, a description of the processings other than S1709 will be skipped. Note that although it is not shown in FIG. 17, the processings S520 to S522 described in Embodiment 1 may be executed after exiting a loop processing at S1710 same as in Embodiment 1. An example for the flowchart in which the consumable supply to be processed is the consumable supply A302 will be described below.

In the present embodiment, at S1709, the display information generating component 202 performs the processing in which the frame 1601 is drawn in the remaining amount bar of the consumable supply 406 and the background of the remaining amount bar 410. A display color of the frame 1601 drawn here may be a fixed color held by the remaining amounts display software for the consumable supplies 201. However, in a case that the display color of the additionally drawn frame 1601 approximately equals to the display color of the remaining amount bar of the consumable supply 406 or the background color of the background of the remaining amount bar 410, the drawing of the frame cannot improve the visibility. Therefore, at S1709, the display information generating component 202 performs the processing shown in FIGS. 18A and 18B for determining the display color of the frame before drawing the frame.

Figure 18A:
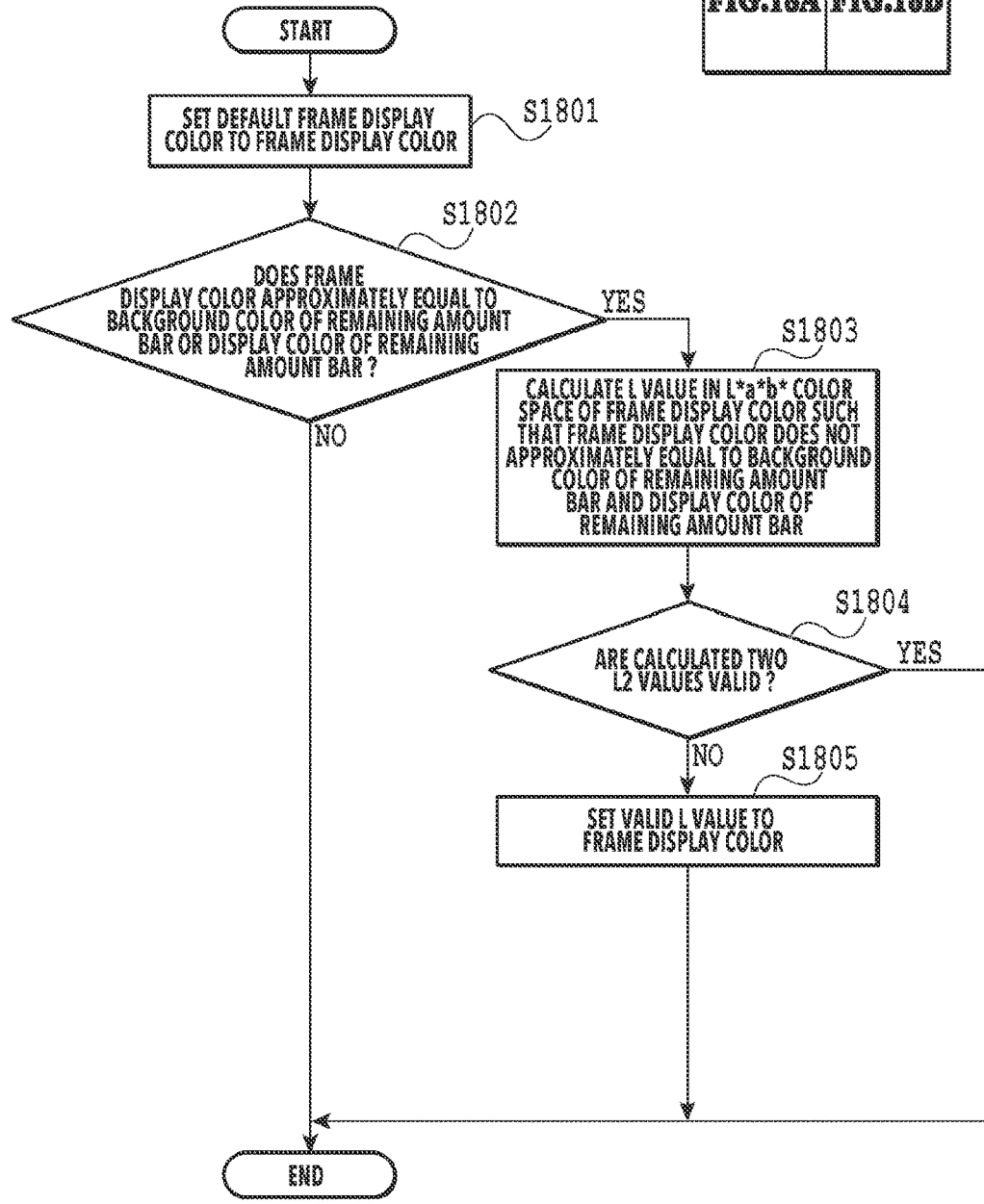
FIGS. 18A and 18B are totally a flowchart illustrating a detail of a drawing processing of frames.
Figure 18B:
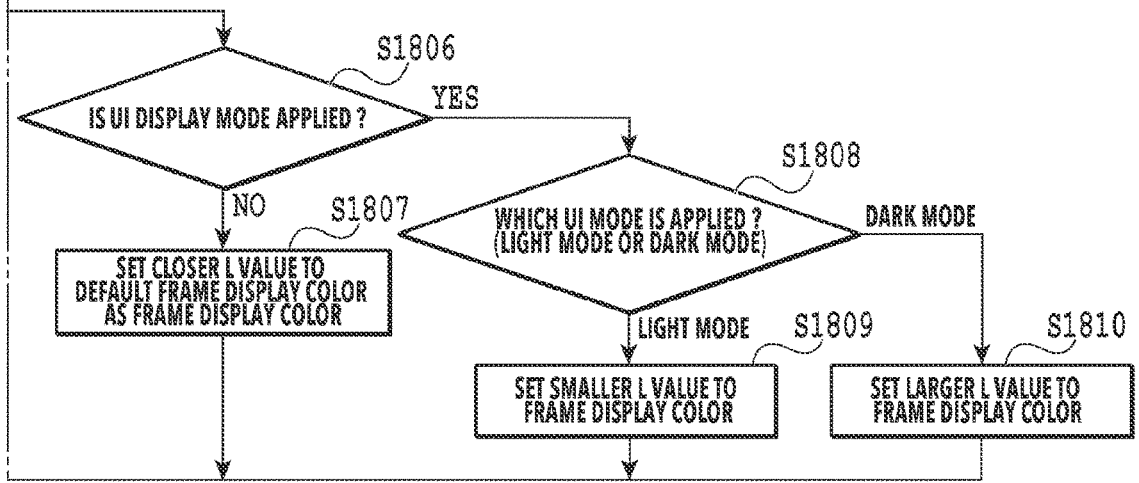

FIGS. 18A and 18B are totally a flowchart illustrating a detail of a processing in which the frame is drawn in the remaining amount bar and its background at S1709. At 1801, the display information generating component 202 sets a default frame display color to the display color of the frame 1601, and proceeds to S1802. At 1802, the display information generating component 202 determines if the frame display color of the frame 1601 approximately equals to the remaining amount display color of the remaining amount bar of the consumable supply 406 or the frame display color of the frame 1601 approximately equals to the background color of the background of the remaining amount bar 410. In a case of the colors are approximately equal each other, the processing in FIGS. 18A and 18B is completed and returns to S1709. The same processing described in Embodiment 1 can be applied for determining if the colors are approximately equal each other.

At S1803, the display information generating component 202 calculates the L value representing the brightness in the L*a*b* color space of the display color of the frame 1601, and proceeds to S1804. That is, the L value is calculated such that the frame display color of the frame 1601 does not approximately equal to the remaining amount display color of the remaining amount bar of the consumable supply 406 and the frame display color of the frame 1601 does not approximately equal to the background color of the background of the remaining amount bar 410. Since processings S1804 to S1810 are same as the processings S702 to S708 shown in FIG. 7 in Embodiment 1, a description of the processings will be skipped. Thus, the display information generating component 202 sets the display color of the frame 1601, completes the processing in FIGS. 18A and 18B, and proceeds to S1709. The above is the description of the processings in the present embodiment.

Note that, in the processing in FIG. 17, the frame is drawn in the case that the remaining amount display color of the remaining amount bar approximately equals to the background color. That is, the frame is not drawn for the consumable supply such that the remaining amount display color of the remaining amount bar does not approximately equal to the background color. However, the frame may be drawn for such consumable supply. That is, in a case that the frame is drawn for at least one consumable supply, the frames may be also drawn for other consumable supplies after exiting the loop processing at S1710. In this case, the frame display colors for other consumable supplies may be determined respectively such that the colors do not approximately equal to the remaining amount display colors of the remaining amount bars and the background colors. Alternately, the processing in which the frames having a common color that does not approximately equal to the remaining amount display colors of the remaining amount bars and the background colors may be drawn for the all consumable supplies.

As described above, in the present embodiment, the color difference between the remaining amount display color of the consumable supply obtained from the peripheral device and the background color in the remaining amount display area is calculated. Then, the frame is drawn in the remaining amount bar and its background in a case that the color difference is within the predetermined threshold value. The display colors for the consumable supplies and the background colors obtained from the peripheral device are not changed in the present embodiment. This enables the user to recognize the actual colors of the consumable supplies and the remaining amounts of the consumable supplies easily.

Other Embodiments

Figure 19:
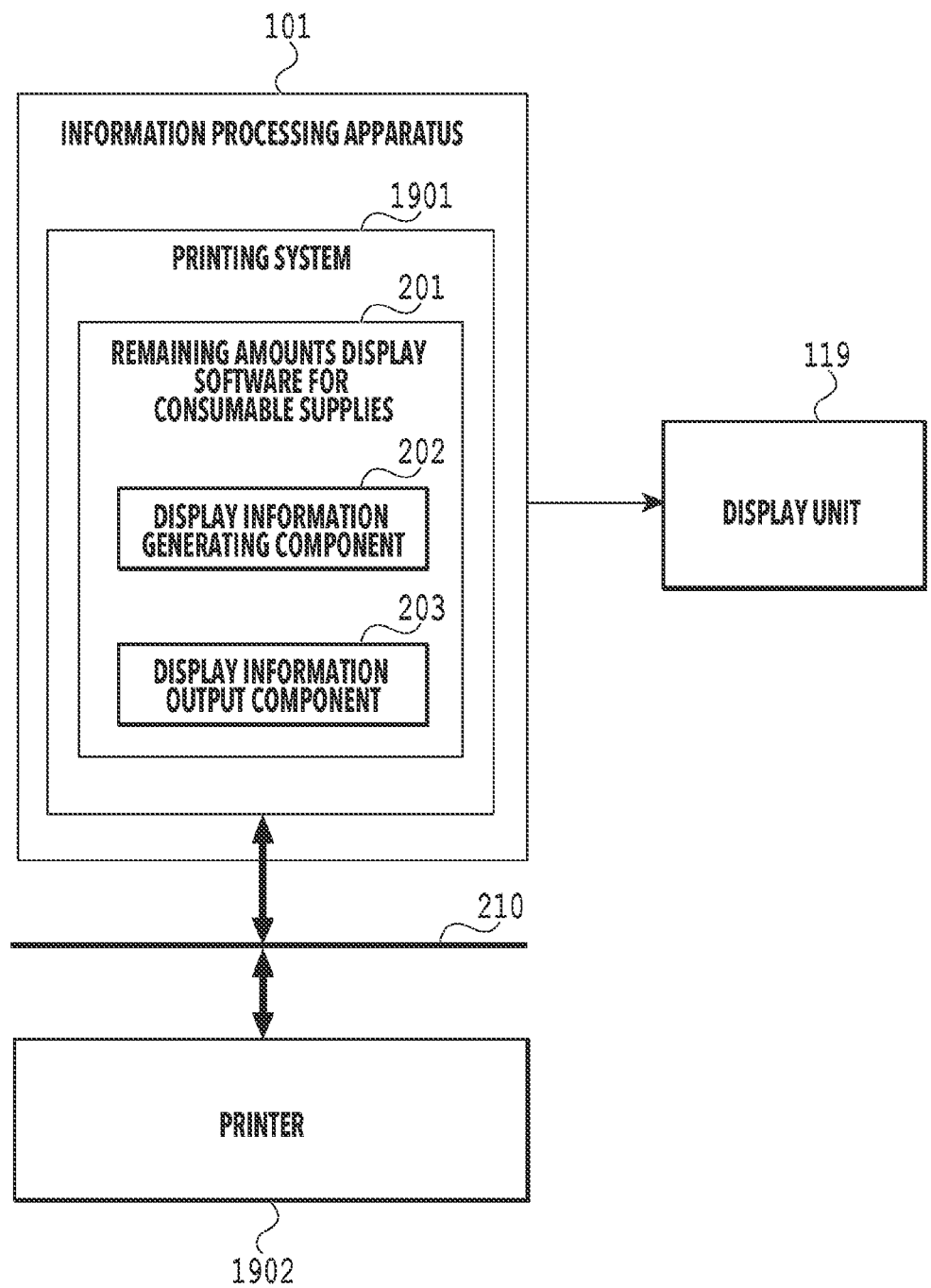
FIG. 19 is a diagram showing a block configuration of a software displaying remaining amounts.

Although the example of the remaining amounts display software for the consumable supplies 201 operating autonomously in the information processing apparatus 101 is described above, embodiments are not limited to this example. For example, a single software installed in a print system 1901 in OS on the information processing apparatus 101 shown in FIG. 19 may be used. In this case, the remaining amounts display software for the consumable supplies 201 displays the remaining amount information of the consumable supplies obtained from printer 1902.

Although the ink cartridge is exemplified as the consumable supply in the above embodiments, the consumable supplies are not limited to this example. For example, the consumable supply may be a toner cartridge, a tape, a waste ink cartridge, or a waste toner cartridge. Any consumable supply may be applied as long as used in the peripheral device and dealing with color information.

Although the example in which the background color is common for the all consumable supplies is described in the above embodiments, embodiments are not limited to this example. For example, the background colors for the consumable supplies may be different each other in a case that the background has a transparent color or the background has gradation in the display screen. In addition, a plurality of colors may be used for the background of single consumable supply. In these cases, same effect can be achieved by performing the processings described in the above embodiments.

Moreover, although the example in which the two colors are converted to L*a*b* color space and the color difference in the converted color space is calculated in the approximation determination of the two colors is described in the above embodiment, embodiments are not limited to use this approximation determination method. A Euclidean distance in an arbitrary color space can be used for the approximation determination of the two colors. Therefore, for example, the approximation determination may be performed in a device-dependent color space or may be performed in a device-independent color space.

The example in which the display color is changed such that the color difference equals to the predetermined threshold value in the case that the color difference between the remaining amount display color and the background color is within the predetermined threshold value is described in the above embodiments. However, the change processing of the color difference is not limited to the above processing. The display color may be changed such that the color difference is within a range of a fixed width from the threshold value in these embodiments.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-087566, filed May 25, 2021, which is hereby incorporated by reference wherein in its entirety.

What is claimed is:

1. A method for display control, comprising:
obtaining information of a remaining amount display color displaying a remaining amount of a consumable supply;
obtaining information of a background color in a displaying area displaying the remaining amount of the consumable supply;
comparing the remaining amount display color with the background color; and
changing a display content in the displaying area on the basis of a result of comparing the remaining amount display color with the background color.

2. The method according to claim 1, wherein the changing the display content comprises changing at least one remaining amount display color in the displaying area.

3. The method according to claim 2, wherein the remaining amount display color of the consumable supply in which a color difference between the remaining amount display color and the background color is within a predetermined threshold value is changed, and the remaining amount display color of the consumable supply in which the color difference is not within the predetermined threshold value is not changed.

4. The method according to claim 2, wherein in a case that the at least one remaining amount display color with respect to the consumable supply is changed and the color differences between the changed remaining amount display color and the other remaining amount display colors are within a predetermined threshold value, a change process is further performed so that color differences between the changed remaining amount display color and the other remaining amount display colors are not within the predetermined threshold value.

5. The method according to claim 1, wherein the changing the display content comprises changing the background color in the displaying area.

6. The method according to claim 5, wherein the background color of the consumable supply in which the color difference between the remaining amount display color and the background color is within a predetermined threshold value is changed, and the background color of the consumable supply in which the color difference is not within the predetermined threshold value is not changed.

7. The method according to claim 1, wherein the consumable supply is an ink cartridge, a toner cartridge, a tape, a waste ink cartridge, or a waste toner cartridge.

8. The method according to claim 1, wherein the changing a display content comprises changing one or more of the remaining amount display color and the background color such that a color difference between the remaining amount display color and the background color is equal to or greater than a predetermined value greater than the color difference before the change.

9. An information processing apparatus, comprising:
at least one memory; and
at least one processor or circuit that functions as:
a first obtaining unit configured to obtain information of a remaining amount display color displaying a remaining amount of a consumable supply;
a second obtaining unit configured to obtain information of a background color in a displaying area displaying the remaining amount of the consumable supply;
a comparing unit configured to compare the remaining amount display color with the background color; and
a changing unit configured to change a display content in the displaying area on the basis of a result of comparing by the comparing unit.

10. The information processing apparatus according to claim 9, wherein the changing unit changes the remaining amount display color in the displaying area on the basis of the result of comparing by the comparing unit.

11. The information processing apparatus according to claim 10, wherein the changing unit changes the remaining amount display color of the consumable supply in which a color difference between the remaining amount display color and the background color is within a predetermined threshold value, and the changing unit does not change the remaining amount display color of the consumable supply in which the color difference is not within the predetermined threshold value.

12. The information processing apparatus according to claim 10, wherein in a case that at least one remaining amount display color with respect to the consumable supply is changed and the color differences between the changed remaining amount display color and the other remaining amount display colors are within a predetermined threshold value, the changing unit further performs a change process so that color differences between the changed remaining amount display color and the other remaining amount display colors are not within the predetermined threshold value.

13. The information processing apparatus according to claim 9, wherein the changing unit changes the background color in the displaying area.

14. The information processing apparatus according to claim 13, wherein the changing unit changes the background color of the consumable supply in which the color difference between the remaining amount display color and the background color is within a predetermined threshold value, and the changing unit does not change the background color of the consumable supply in which the color difference is not within the predetermined threshold value.

15. The information processing apparatus according to claim 9, wherein the consumable supply is an ink cartridge, a toner cartridge, a tape, a waste ink cartridge, or a waste toner cartridge.

16. The information processing apparatus according to claim 9, wherein the changing unit changes one or more of the remaining amount display color and the background color such that a color difference between the remaining amount display color and the background color is equal to or greater than a predetermined value greater than the color difference before the change.

17. A non-transitory computer readable storage medium storing a program which causes a computer to execute a method for display control, the method for display control, comprising:
    obtaining information of a remaining amount display color displaying a remaining amount of a consumable supply;
    obtaining information of a background color in a displaying area displaying the remaining amount of the consumable supply;
    comparing the remaining amount display color with the background color; and
    changing a display content in the displaying area on the basis of a result of comparing the remaining amount display color with the background color.

18. The non-transitory computer readable storage medium according to claim 17, wherein the changing the display content comprises changing at least one remaining amount display color in the displaying area.

19. The non-transitory computer readable storage medium according to claim 18, wherein the remaining amount display color of the consumable supply in which a color difference between the remaining amount display color and the background color is within a predetermined threshold value is changed, and the remaining amount display color of the consumable supply in which the color difference is not within the predetermined threshold value is not changed.

20. The non-transitory computer readable storage medium according to claim 18, wherein in a case that the at least one remaining amount display color with respect to the consumable supply is changed and the color differences between the changed remaining amount display color and the other remaining amount display colors are within a predetermined threshold value, a change process is further performed so that color differences between the changed remaining amount display color and the other remaining amount display colors are not within the predetermined threshold value.

21. The non-transitory computer readable storage medium according to claim 17, wherein the changing display content comprises changing the background color in the displaying area.

22. The non-transitory computer readable storage medium according to claim 21, wherein the background color of the consumable supply in which the color difference between the remaining amount display color and the background color is within a predetermined threshold value is changed, and the background color of the consumable supply in which the color difference is not within the predetermined threshold value is not changed.

23. The non-transitory computer readable storage medium according to claim 17, wherein the consumable supply is an ink cartridge, a toner cartridge, a tape, a waste ink cartridge, or a waste toner cartridge.

24. The non-transitory computer readable storage medium according to claim 17, wherein the changing the display content comprises changing one or more of the remaining amount display color and the background color such that a color difference between the remaining amount display color and the background color is equal to or greater than a predetermined value greater than the color difference before the change.

25. A method for controlling an information processing apparatus, the method comprising:
    performing control to obtain information of a background color in a displaying area displaying a remaining amount of the consumable supply;
    performing control to display a remaining amount of a specific consumable supply in a first color in a case where the background color is a third color; and
    performing control to display the remaining amount of the specific consumable supply in a second color in a case where the background color is a fourth color.

26. The method according to claim 25 comprising
    performing control to obtain information of a remaining amount display color displaying the remaining amount of the consumable supply,
    wherein the first color and the second color are both based on the remaining amount display color.

27. The method according to claim 26,
    wherein the first color is the remaining amount display color, and
    the second color is a color obtained by changing the remaining amount display color such that a second color difference between the background color and the changed remaining amount display color is greater than a first color difference between the background color and the remaining amount display color.

28. An information processing apparatus, comprising:
    at least one memory; and
    at least one processor or circuit that functions as:
    an obtaining unit configured to obtain information of a background color in a displaying area displaying a remaining amount of the consumable supply; and
    a display control unit configured to perform control to display a remaining amount of a specific consumable supply in a first color in a case where the background color is a third color and to display the remaining amount of the specific consumable supply in a second color in a case where the background color is a fourth color.

29. The information processing apparatus according to claim 28, wherein
    the obtaining unit further obtains information of a remaining amount display color displaying the remaining amount of the consumable supply, and
    the first color and the second color are both based on the remaining amount display color.

30. The information processing apparatus according to claim 29,
wherein the first color is the remaining amount display color, and
the second color is a color obtained by changing the remaining amount display color such that a second color difference between the background color and the changed remaining amount display color is greater than a first color difference between the background color and the remaining amount display color.

31. A non-transitory computer readable storage medium storing a program which causes a computer to execute a method for controlling an information processing apparatus, the method comprising:
performing control to obtain information of a background color in a displaying area displaying a remaining amount of the consumable supply;
performing control to display a remaining amount of a specific consumable supply in a first color in a case where the background color is a third color; and
performing control to display the remaining amount of the specific consumable supply in a second color in a case where the background color is a fourth color.

32. The non-transitory computer readable storage medium according to claim 31, the method comprising:
performing control to obtain information of a remaining amount display color displaying the remaining amount of the consumable supply,
wherein the first color and the second color are both based on the remaining amount display color.

33. The non-transitory computer readable storage medium according to claim 32, the method comprising:
wherein the first color is the remaining amount display color, and
the second color is a color obtained by changing the remaining amount display color such that a second color difference between the background color and the changed remaining amount display color is greater than a first color difference between the background color and the remaining amount display color.

* * * * *